(12) United States Patent
Cappelletti et al.

(10) Patent No.: US 11,079,486 B2
(45) Date of Patent: Aug. 3, 2021

(54) METHOD OF VERIFYING A POTENTIAL DETECTION OF A MAN OVERBOARD EVENT AND ALERT VERIFICATION PROCESSING APPARATUS

(71) Applicant: MARSS Ventures S.A., Panama (PA)

(72) Inventors: Marco Cappelletti, Rosignano Marittimo (IT); Alberto Baldacci, Uzzano (IT)

(73) Assignee: MARSS VENTURES S.A., Panama (PA)

(*) Notice: Subject to any disclaimer, the term of this patent is extended or adjusted under 35 U.S.C. 154(b) by 236 days.

(21) Appl. No.: 16/096,880

(22) PCT Filed: Apr. 28, 2017

(86) PCT No.: PCT/IB2017/052480
§ 371 (c)(1),
(2) Date: Oct. 26, 2018

(87) PCT Pub. No.: WO2017/187407
PCT Pub. Date: Nov. 2, 2017

(65) Prior Publication Data
US 2019/0137620 A1 May 9, 2019

(30) Foreign Application Priority Data
Apr. 29, 2016 (GB) .................................... 1607533

(51) Int. Cl.
*G01S 13/88* (2006.01)
*G08B 21/08* (2006.01)
(Continued)

(52) U.S. Cl.
CPC .......... *G01S 13/886* (2013.01); *B63C 9/0005* (2013.01); *G01S 13/72* (2013.01);
(Continued)

(58) Field of Classification Search
CPC ..... B63C 9/0005; G01S 13/72; G01S 13/723; G01S 13/88; G01S 13/886;
(Continued)

(56) References Cited

U.S. PATENT DOCUMENTS 5,408,238 A * 4/1995 Smith .................. B63C 9/0005
342/357.55
8,998,666 B1 * 4/2015 Albright .................. B63C 9/20
441/80
(Continued)

FOREIGN PATENT DOCUMENTS

GB          2493390 A       2/2013
WO      WO-13021183 A1     2/2013

OTHER PUBLICATIONS

Bor-Horng Sheu et al., "Real-time Alarm, Dynamic GPS Tracking, and Monitoring System for Man Overboard" Sensors and Materials, (Year: 2020).*

(Continued)

*Primary Examiner* — Mekonen T Bekele
(74) *Attorney, Agent, or Firm* — Harness, Dickey & Pierce, P.L.C.

(57) ABSTRACT

A method of verifying a potential detection of a man overboard event recorded as a moving object in a plurality of sequential frames of image data in respect of a duration of a time window comprises receiving (900) ranging track data in respect of the time window. A geometric chord is then identified that intersects a start point and an end point of a path described by a ranging track of the ranging track data. A height of the start point and an angle defined by a convergence of the chord and a vertical are then determined (902, 906). The height and the angle are then compared relative to a boundary line in order to classify (910) the path (Continued)

described by the ranging track in relation to a man overboard event, thereby validating the potential detection.

20 Claims, 13 Drawing Sheets

(51) Int. Cl.
*B63C 9/00* (2006.01)
*G06K 9/00* (2006.01)
*G01S 13/72* (2006.01)

(52) U.S. Cl.
CPC ............ *G01S 13/723* (2013.01); *G01S 13/88* (2013.01); *G06K 9/00771* (2013.01); *G08B 21/08* (2013.01)

(58) Field of Classification Search
CPC ................ G06K 9/00771; G06T 7/254; G08B 13/2494; G08B 21/08; G08B 21/086; H04N 5/144; H04N 7/181; H04N 7/188
See application file for complete search history.

(56) References Cited

U.S. PATENT DOCUMENTS

| | | |
|---|---|---|
| 9,106,810 B1 | 8/2015 | Hadsall, Sr. |
| 9,569,671 B1* | 2/2017 | Maali ....................... H04N 5/77 |
| 2011/0279673 A1 | 11/2011 | Teich et al. |
| 2012/0229282 A1* | 9/2012 | Zagami ..................... H04N 7/18 340/573.6 |
| 2013/0169809 A1* | 7/2013 | Grignan ................. G08B 21/08 348/148 |
| 2013/0214942 A1 | 8/2013 | Joss |
| 2018/0043977 A1* | 2/2018 | Assal ................. G06K 9/00342 |

OTHER PUBLICATIONS

International Search Report PCT/ISA/210 for International Application No. PCT/IB2017/052480 dated Sep. 4, 2017.
Written Opinion of the International Searching Authority PCT/ISA/237 for International Application No. PCT/IB2017/052480 dated Sep. 4, 2017.

* cited by examiner

1

METHOD OF VERIFYING A POTENTIAL DETECTION OF A MAN OVERBOARD EVENT AND ALERT VERIFICATION PROCESSING APPARATUS

The present invention relates to a method of verifying a potential man overboard event, the method being of the type that, for example, employs ranging data to generate an alert to a potential man overboard event. The present invention also relates to an alert verification processing apparatus of the type that, for example, employs ranging data to generate an alert to a potential man overboard event.

Marine vessels are commonly used modes of transport for transporting cargos and passengers over bodies of water of varying distances. Furthermore, it is known to transport cargos and/or passengers using different types of vessel suited to the types of cargo or passenger to be transported, for example cruise ships, cargo vessels, oil tankers, and ferry boats. However, on occasions passengers on these vessels can accidentally fall overboard and in some unfortunate cases intentionally jump overboard. Such events are known as "man overboard" events.

When a person is overboard, the typical way of detecting the occurrence of such an event is by way of witnesses. However, witnesses are not always present to see the man overboard event. This can particularly be the case at night.

When a man overboard event occurs, the vessel has to turn back and try to search for and rescue the person in the water. This search and attempted rescue procedure typically has an associated financial cost as well as a time cost. These costs are particularly acute when hours or even days have to be expended before finding the overboard person.

Additionally, the longer a search continues the less likely the passenger is to be found alive. Further, the time taken to detect the man overboard event accurately can impact upon the duration of the search and rescue procedure.

A number of man overboard detection systems exist. However, many such systems require passengers to wear a tag-like device, the absence of such a device from within a monitored volume surrounding the vessel being detectable by one or more monitoring units. When a man overboard event occurs, a person wearing the device enters the water but the vessel typically continues travelling, resulting in a distance between the device and the vessel developing. In such circumstances, the device rapidly falls out of range of the monitoring units aboard the vessel and so one of the monitoring units initiates an alert to the crew of the vessel indicative of the occurrence of a man overboard event. In some systems, the devices worn by passengers are configured to detect immersion in water in order to ensure the alert is triggered with minimal delay.

While such systems are useful, they have a core requirement that the tags need to be worn by passengers. Unfortunately, the tags can be removed, either accidentally or intentionally by passengers, thereby reducing the reliability of the man overboard detection system. Furthermore, tag-based systems are not typically designed to enhance safety aboard cruise ships or ferry boats; the systems are usually used aboard smaller vessels carrying a small number of passengers where a high probability of a man overboard event occurring exists, for example aboard racing yachts.

International patent publication no. WO 2013/021183 discloses a monitoring system suitable for detecting a man overboard event without the use of tags that need to be worn. The system employs a detection system that has an imaging resolution that prevents conclusive visual identification, by a human operator, of the nature of a detected moving body. The system therefore also employs a video capture apparatus to provide video data in respect of the same field of view as the detection system. The detection system has a monitoring station, which receives data from both the detection system and the video capture apparatus, and is arranged to enable the human operator to review the video data in response to a detection by the detection system of passage of a body, thereby enabling the human operator to identify readily the nature of the body and provide confirmatory visual evidence when the body is human.

However, it is desirable to optimise the system further to increase the efficiency with which the passage of a human body is detected, for example to improve speed of detection, improve the classification of alarm events, and improve isolation of relevant video data.

According to a first aspect of the invention, there is provided a method of verifying a potential detection of a man overboard event recorded as a moving object in a plurality of sequential frames of image data in respect of a duration of a time window, the method comprising: receiving ranging track data in respect of the time window identifying a geometric chord intersecting a start point and an end point of a path described by a ranging track of the ranging track data; determining a height of the start point; determining an angle defined by a convergence of the chord and a vertical; and comparing the height and the angle relative to a boundary line in order to classify the path described by the ranging track in relation to a man overboard event, thereby validating the potential detection.

The boundary line may be defined by a first parameter and a second parameter. The first parameter may be height and the second parameter may be angle.

The boundary line may be based upon empirical data. The empirical data may comprise clusters of pairs of height and angle data.

The method may further comprise: receiving an alert indicative of the potential detection of the man overboard event; and disregarding the alert when evaluation of the ranging track data by the comparison of the height and the angle relative to the boundary line results in a determination that the ranging track data does not relate to the man overboard event.

Classification of the path described by the ranging track data as corresponding to the man overboard event may comprise evaluation of the height and the angle relative to a predetermined boundary line extending in a height-angle plane.

According to a second aspect of the present invention, there is provided a method of filtering alerts caused by wave motion from alerts caused by a man overboard event comprising the method of verifying a detection of a potential man overboard event as set forth above in relation to the first aspect of the invention.

According to a third aspect of the present invention, there is provided a method of configuring a radar track analyser for verification of a man overboard event, the method comprising: receiving a plurality of ranging track data sets; for each of the plurality of ranging track data sets: identifying a respective geometric chord intersecting a respective start point and a respective end point of a path described by a ranging track of the ranging track data; determining a respective height of the respective start point; determining a respective angle defined by a respective convergence of the respective chord and a vertical; recording the respective height, the respective angle and a respective verified man overboard event status corresponding to the respective height and respective angle; and identifying a first cluster of height and angle pairs and a second cluster of height and angle pairs; determining a boundary between the first and second clusters of height and angle pairs.

The boundary may correspond to a two-dimensional threshold.

According to a fourth aspect of the present invention, there is provided an alert verification processing apparatus for verifying a potential detection of a man overboard event recorded as a moving object in a plurality of sequential frames of image data in respect of a duration of a time window, the apparatus comprising: a processing resource arranged to receive ranging track data in respect of the time window; wherein the processing resource is arranged to identify a geometric chord intersecting a start point and an end point of a path described by a ranging track of the ranging track data; the processing resource is arranged to support an angle calculator and a height calculator; the height calculator is arranged to determine a height of the start point; the angle calculator is arranged to determine an angle defined by a convergence of the chord and a vertical; and a comparator arranged to compare the height and the angle relative to a boundary line in order to classify the path described by the ranging track in relation to a man overboard event, thereby validating the potential detection.

The boundary line may be defined by a first parameter and a second parameter. The first parameter may be height and the second parameter may be angle.

The boundary line may be based upon empirical data. The empirical data may comprise clusters of pairs of height and angle data.

The processing resource may be arranged to receive an alert indicative of the potential detection of the man overboard event; and the processing resource may be arranged also to disregard the alert when evaluation of the ranging track data by the comparison of the height and the angle relative to the boundary line results in a determination that the ranging track data does not relate to the man overboard event.

Classification of the path described by the ranging track data as corresponding to the man overboard event may comprise the comparator evaluating the height and the angle relative to the boundary line extending in a height-angle plane.

According to a fifth aspect of the present invention, there is provided an alert filtering apparatus for filtering alerts caused by wave motion from alerts caused by a man overboard event, the apparatus comprising the alert verification processing apparatus as set forth above in relation to the fourth aspect of the invention.

According to a sixth aspect of the present invention, there is provided a configuration apparatus for a radar track analyser for verification of a man overboard event, the apparatus comprising: a processing resource arranged to receive a plurality of ranging track data sets; wherein for each of the plurality of ranging track data sets, the processing resource is arranged to: identify a respective geometric chord intersecting a respective start point and a respective end point of a path described by a ranging track of the ranging track data; determine a respective height of the respective start point; determine a respective angle defined by a respective convergence of the respective chord and a vertical; record the respective height, the respective angle and a respective verified man overboard event status corresponding to the respective height and respective angle; and the processing resource is further arranged to identify a first cluster of height and angle pairs and a second cluster of height and angle pairs; and the processing resource is arranged to determine a boundary between the first and second clusters of height and angle pairs.

The boundary may correspond to a two-dimensional threshold.

According to a seventh aspect of the invention, there is provided a computer program code element arranged to execute the method as set forth above in relation to the first aspect of the invention. The computer program code element may be embodied on a computer readable medium.

According to an eighth aspect of the invention, there is provided a computer program code element arranged to execute the method as set forth above in relation to the second aspect of the invention. The computer program code element may be embodied on a computer readable medium.

It is thus possible to provide a method and apparatus that enables improved classification of detected events using an imaging device having a resolution that prevents conclusive visual identification by a human operator. The method and apparatus therefore provide increased detection accuracy as well as enabling the human operator to inspect video imagery in a reduced timeframe, thereby increasing the prospects of a detection translating into a successful rescue. In this respect, the method and apparatus reduces the false alarm rate of the system.

At least one embodiment of the invention will now be described, by way of example only, with reference to the accompanying drawings, in which.

Throughout the following description identical reference numerals will be used to identify like parts.

Figure 1:
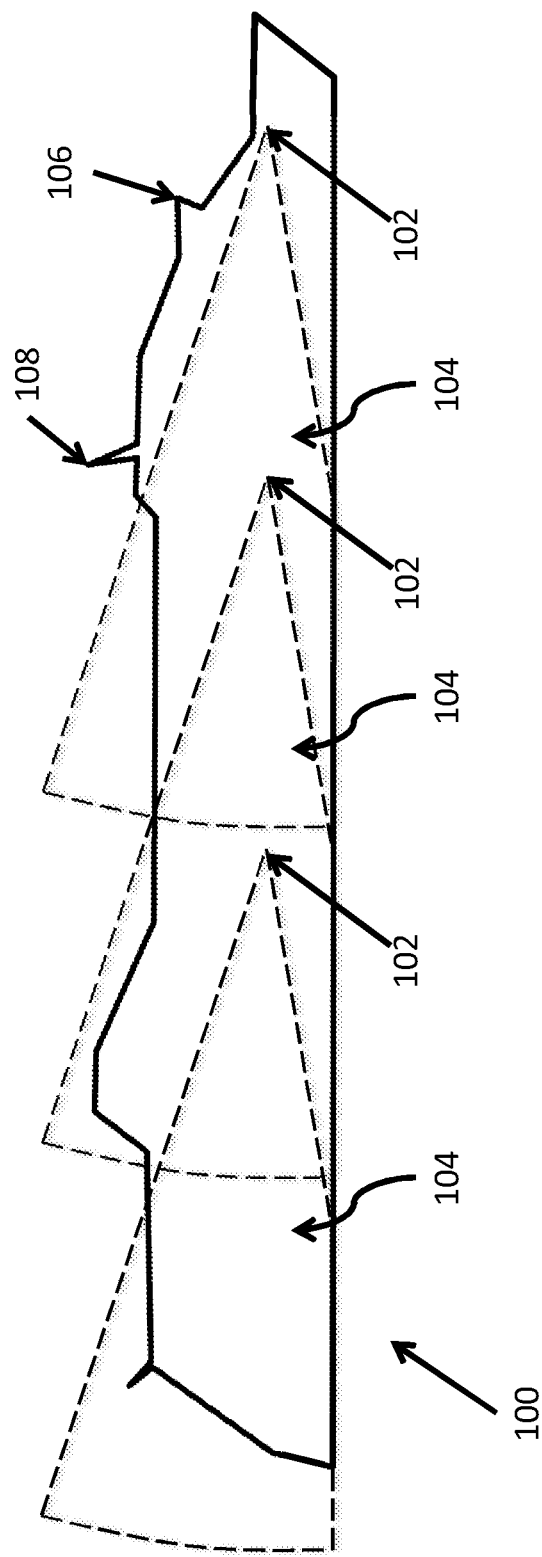
FIG. 1 is a schematic diagram of a vessel to be monitored by a monitoring system constituting an embodiment of the invention.

Referring to FIG. 1, a passenger liner 100 is an example of a vessel, such as a seafaring vessel, to be monitored for a so-called man overboard event. The vessel 100 is just one example of a structure that can be monitored. The vessel 100 can be of a type other than the passenger liner mentioned above. In this respect, the vessel 100 can be a ferry boat, or other kind of ship or platform, fixed or floating. As mentioned above, the structure need not be a vessel, for example the structure can be a building or a bridge. Indeed, the structure for the purposes of the examples described herein can be anything having an exterior that can be enveloped by a volume and it is desirous to monitor the volume to detect a body passing through at least part of the volume.

In this example, the vessel 100 is likewise enveloped by a volume that needs to be monitored in a manner to be described later herein. Consequently, the vessel 100 is equipped with monitoring modules 102 placed at strategic points about the vessel 100. Each monitoring module 102 has a respective coverage field or region 104 and, in this example, the monitoring modules 102 are arranged in order that the individual coverage volumes extend in order to monitor all portions of the volume enveloping the vessel 100 that require surveillance. It can therefore be appreciated that, in this example, the respective coverage fields are three dimensional. To provide comprehensive surveillance, it is therefore necessary to ensure that any part of the exterior of the vessel 100 across which a body can pass, in the event of accidental or intentional falling from the vessel 100, is monitored. Furthermore, it is desirable to ensure that portions of the volume being monitored extend sufficiently far to ensure that it is possible to determine from where a passenger has possibly fallen. In this respect, this can be achieved by employing a greater number of monitoring modules or monitoring modules of greater range.

The monitoring modules 102 are capable of communicating with a monitoring station apparatus (not shown in FIG. 1). In this example, the monitoring station is located on the bridge 106 of the vessel 100. The vessel 100 is also equipped with a Global Navigation Satellite System (GNSS) receiver (not shown) coupled to a GNSS antenna 108 with which the vessel 100 is also equipped.

Figure 2:
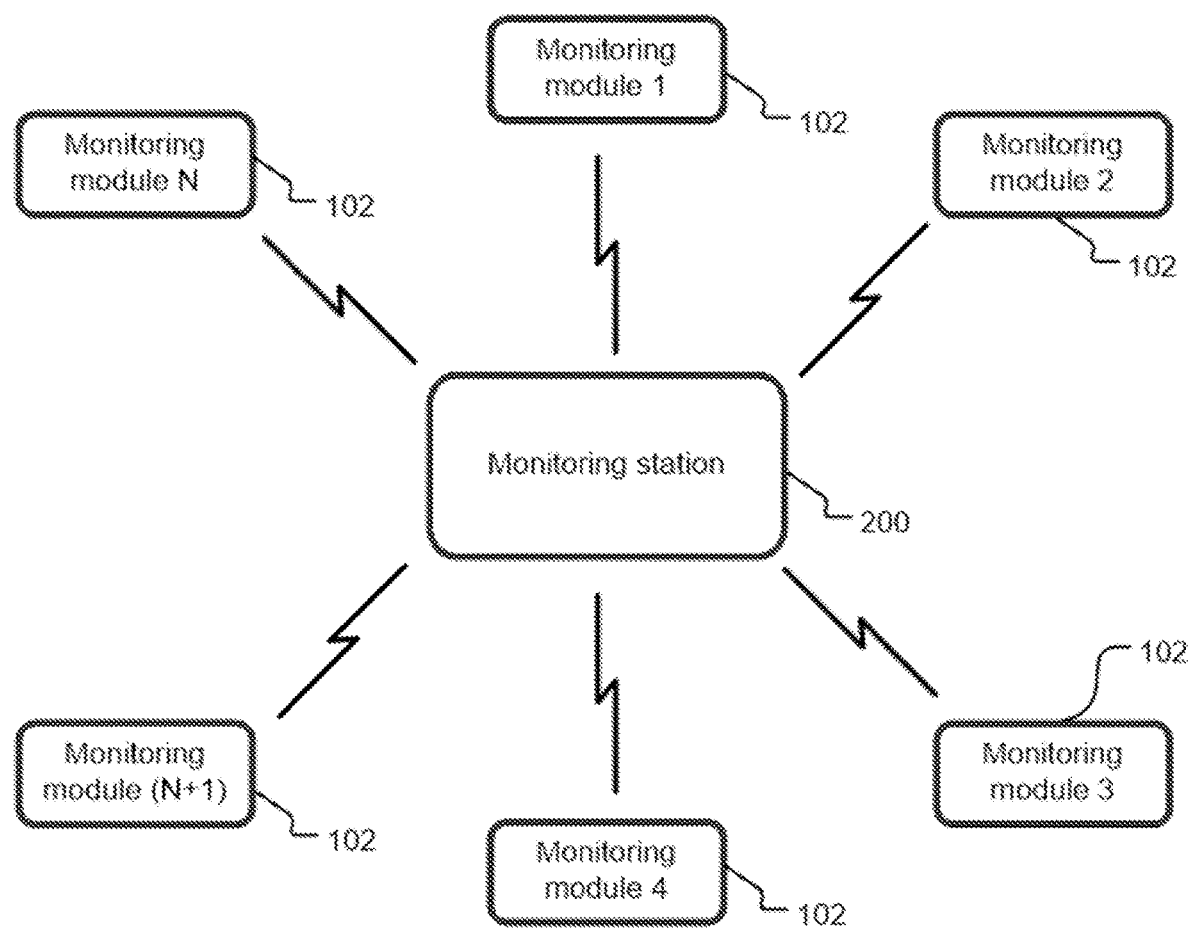
FIG. 2 is a schematic diagram of the monitoring system of FIG. 1.

Turning to FIG. 2, a wireless communications network is provided in order to support communications between the monitoring modules 102 and the monitoring station 200. Of course, if feasible and desirable, the communications network can be wired or a combination of wired and wireless communication technologies.

In one embodiment, which is an example of centralised processing, information collected by the monitoring modules 102 is transmitted, to the monitoring station 200 for central processing by the monitoring station 200. In the present embodiment employing distributed processing, data processing is performed by the monitoring module 102, resulting in alarm messages being transmitted to the monitoring station 200. The actual processing architecture employed depends on a number of factors. However, distributed processing ensures that the monitoring station 200 is not burdened with an excessive amount of processing and minimises the risk of network traffic saturation. Additionally, if certain processing functions described later herein relating to detection of a falling body are performed centrally by the monitoring station 200, as opposed to being performed by individual monitoring modules 102, a central failure of the monitoring station 200 will result in a complete failure of the monitoring system instead of a partial failure confined to failure of a particular monitoring module 102. The failure does not therefore result in a failure to monitor all portions of the volume of the vessel 100 being monitored. Additionally, although for some installations a centralised approach may reduce overall system costs, simplify software maintenance and upgrading, and increase overall system reliability, some ships or yachts do not have room to support a central processing architecture, which would typically include a server rack.

Figure 3:
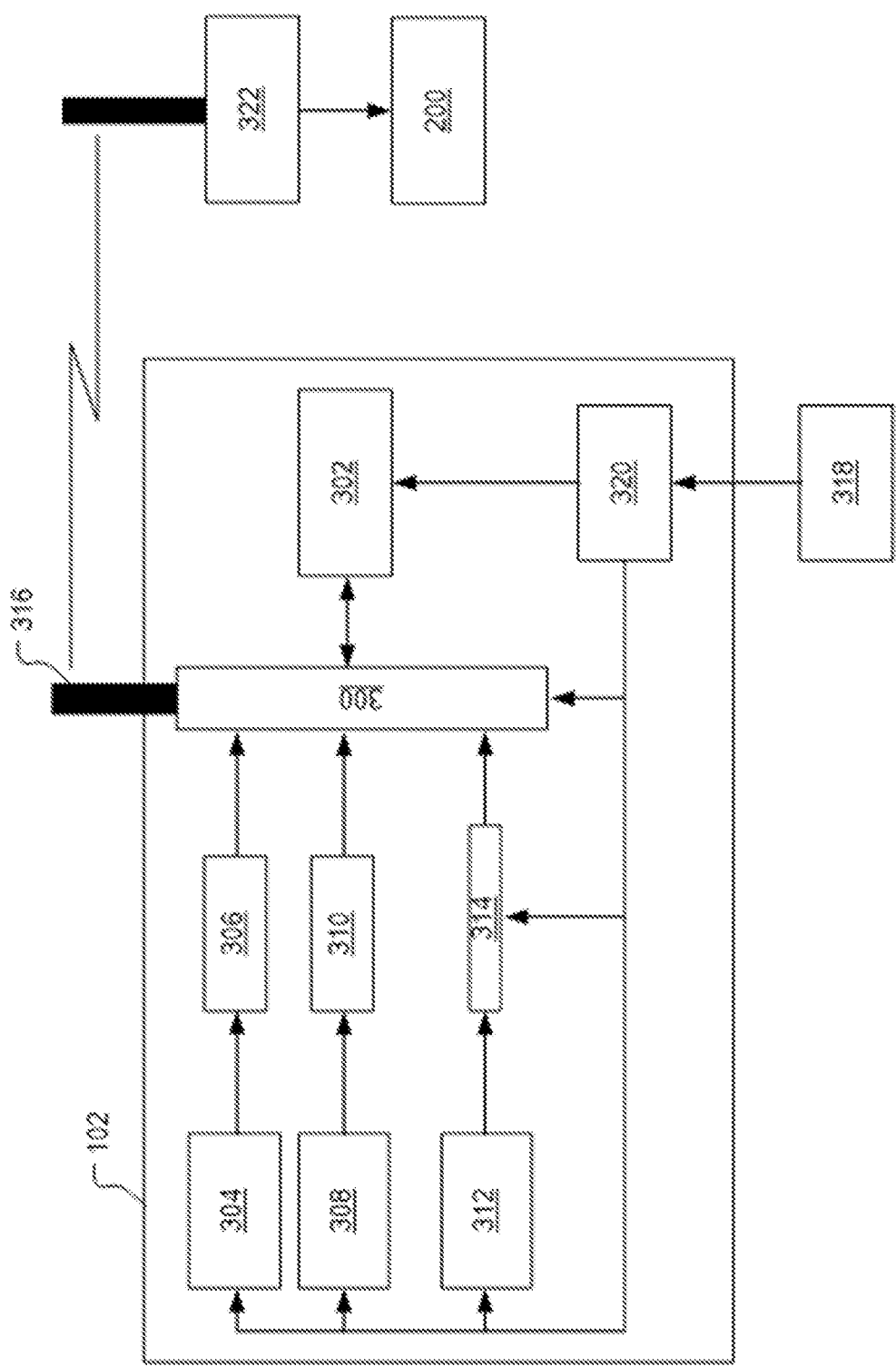
FIG. 3 is a schematic diagram of a monitoring module of the system of FIG. 2 in greater detail and constituting another embodiment of the invention.

Referring to FIG. 3, the monitoring module 102 comprises a data communication module 300, for example a Local Area Network (LAN) switch, provided in order to support communication between a local processing resource, for example a local processor 302, and the monitoring station 200. A first detection module 304 is coupled to the processing resource 302 by way of a first appropriate interface unit 306. Similarly, a second detection module 308 is coupled to the processing resource 302 by way of a second appropriate interface unit 310. Of course, whilst in this example reference is made to the first and second detection modules 304, 308, the skilled person should appreciate that a greater or fewer number of detection modules can be employed. In this example, the first and second detection modules 304, 308 are automotive forward-looking radars, for example the ARS 309 model of automotive radar available from A.D.C. GmbH (a subsidiary of Continental Corporation), although the skilled person should understand that other ranging devices can be employed. In another embodiment, the detection modules can be microwave barriers, such as the ERMO series of microwave barriers available from CIAS Elettronica Srl. Returning to the present example, the first and second interface units 306 and 310 are coupled to the processing resource 302 via suitable Universal Serial Bus (USB) ports of the processing resource 302. In this example, the first and second detection modules 304, 308 therefore send collected data over a Controller Area Network (CAN) and so the first and second interface units 306, 310 are CAN-to-USB interface units. The first and second detection modules 304, 308 can alternatively be connected to the rest of the system hardware by means of other interfaces, for example a LAN interface or a standard serial interface. In another embodiment, the first and second detection modules 304, 308 can be arranged to output data via their own USB, LAN or serial interface by default. In such circumstances, the first and second interface units 306, 310 are not required.

An infrared camera 312, having in this example a frame rate of 25 Hz is coupled to a video server unit 314 via a coaxial cable. The camera 312 and the video acquisition or server unit 314 constitute a video capture apparatus that provides video data to the processing resource 302. In this example, the camera 312 is a thermal imaging camera for example a TAU320 IR camera core available from FLIR systems, which detects temperature differences and is therefore capable of working in total absence of light. However, any other suitable camera can be used. Indeed, the skilled person should appreciate that other camera types can be employed, for example when it is not necessary to monitor the vessel 100 in poor light conditions, such as at night. The video acquisition unit 314 is any suitable video processing unit, for example a suitably configured PC video card or a USB video capture device, capable of capturing video from image data communicated by the infrared camera 312. In the event that the video acquisition unit 314 is a USB video capture device, the video capture device is coupled to the processing resource 302 via another suitable USB port of the processing resource 302. In this example, the camera is positioned so that the field of view of the camera 312 is trained on a region that includes the fields of view of the first and second detection modules 304, 308. Of course, if only a single radar module is employed, the camera 312 is trained on a region that includes the field of view of the single radar module.

The first radar module 304 and the second radar module 308 can be coupled to the first and second radar-to-USB interface units 306, 310 using a communications standard other than the CAN standard. However, the CAN standard is convenient, because in this example the first and second radar modules 304, 308 are automotive forward-looking radars having CAN standard interfaces.

A power supply unit 318 is coupled to a low-voltage power supply unit 320, the low voltage power supply unit 320 being coupled to the first radar modules 304, the second radar module 308, the infrared camera 312, the data communications module 300, and the local processor 302 in order to supply these entities with power.

The data communications module 300 is also arranged to support wireless communications over the wireless communications network. To this end, the data communications module 300 comprises an antenna 316 for wireless communications and is appropriately configured. In this example, the wireless communications network operates in accordance with one of the "wifi" standards, for example IEEE 802.11 b, g or n. Consequently, the data communications module 300 is configured to support one or more of these wifi standards.

The data communications module 300 is capable of communicating with a wireless communications gateway 322 located, in this example, on or near the bridge 106 of the vessel 100. The antenna 316 can therefore be either omnidirectional or directional, depending on the module installation point with respect to the wireless communications gateway 322. The wireless communications gateway 322 is coupled to the monitoring station 200. Depending on mount position of the monitoring modules 102, the monitoring modules 102 can communicate with the wireless communications gateway 322 that can be located at a convenient location on the vessel 100. The wireless communications gateway 322 can then be connected either by wire or wirelessly to the monitoring station 200.

In one implementation, the interface units 306, 310, 314, the data communications module 300 and the local processor 302 can be integrated onto a common circuit board.

Figure 4:
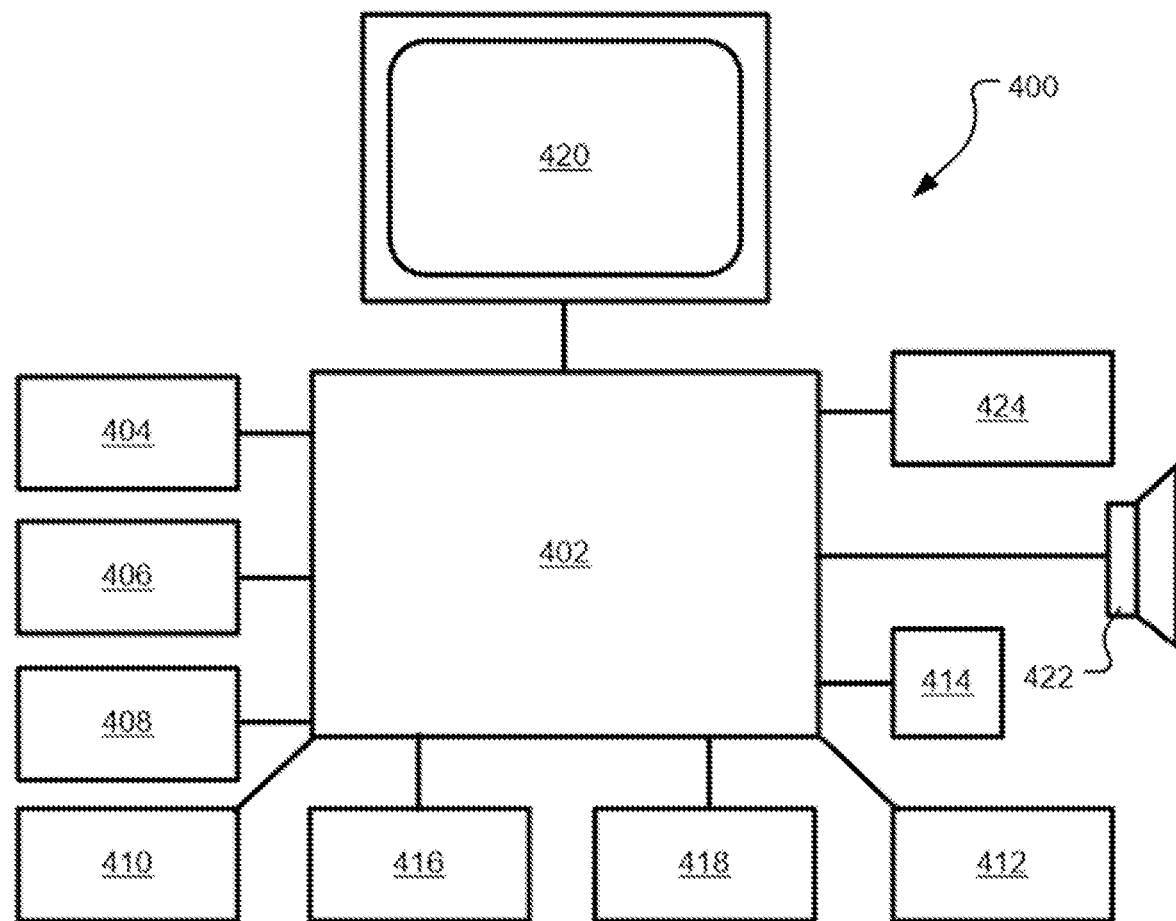
FIG. 4 is a schematic diagram of a monitoring station of the system of FIG. 2 in greater detail.

Referring to FIG. 4, the monitoring station 200 is, in this example, supported by a computing apparatus 400, for example a suitably configured Personal Computer (PC). In overview, the computing apparatus 400 comprises a processing resource 402, for example a processor, such as a microprocessor.

The processor 402 is coupled to a plurality of storage devices, including a hard disc drive 404, a Read Only Memory (ROM) 406, a digital memory, for example a flash memory 408, and a Random Access Memory (RAM) 410.

The processor 402 is also coupled to one or more input devices for inputting instructions and data by a human operator, for example a keyboard 412 and a mouse 414.

A removable media unit 416 coupled to the processor 402 is provided. The removable media unit 416 is arranged to read data from and possibly write data to a removable data carrier or removable storage medium, for example a Compact Disc-ReWritable (CD-RW) disc.

The processor 402 can be coupled to a Global Navigation Satellite System (GNSS) receiver 418 for receiving location data, either directly or via the LAN. Similarly, the processor 402 can be coupled to a navigation information system of the vessel 100 for receiving attitude information (yaw, tilt, roll) concerning the vessel 100. A display 420, for instance, a monitor, such as an LCD (Liquid Crystal Display) monitor, or any other suitable type of display is also coupled to the processor 402. The processor 402 is also coupled to a loudspeaker 422 for delivery of audible alerts. Furthermore, the processor 402 is also able to access the wireless communications network by virtue of being coupled to the wireless communications gateway 322 via either a wireless communications interface 424 or indirectly by wire.

The removable storage medium mentioned above can comprise a computer program product in the form of data and/or instructions arranged to provide the monitoring station 200 with the capacity to operate in a manner to be described later herein. However, such a computer program product may, alternatively, be downloaded via the wireless communications network or any other network connection or portable storage medium.

The processing resource 402 can be implemented as a standalone system, or as a plurality of parallel operating processors each arranged to carry out sub-tasks of a larger computer program, or as one or more main processors with several sub-processors.

Although the computing apparatus 400 of FIG. 4 has been referred to as a Personal Computer in this example, the computing apparatus 400 can be any suitable computing apparatus, for example: a Tablet PC or other slate device, a workstation, a minicomputer or a mainframe computer. The computing apparatus 400 can also include different bus configurations, networking platforms, and/or multi-processor platforms. Also, a variety of suitable operating systems is available for use, including UNIX, Solaris, Linux, Windows or Macintosh OS.

Figure 5:
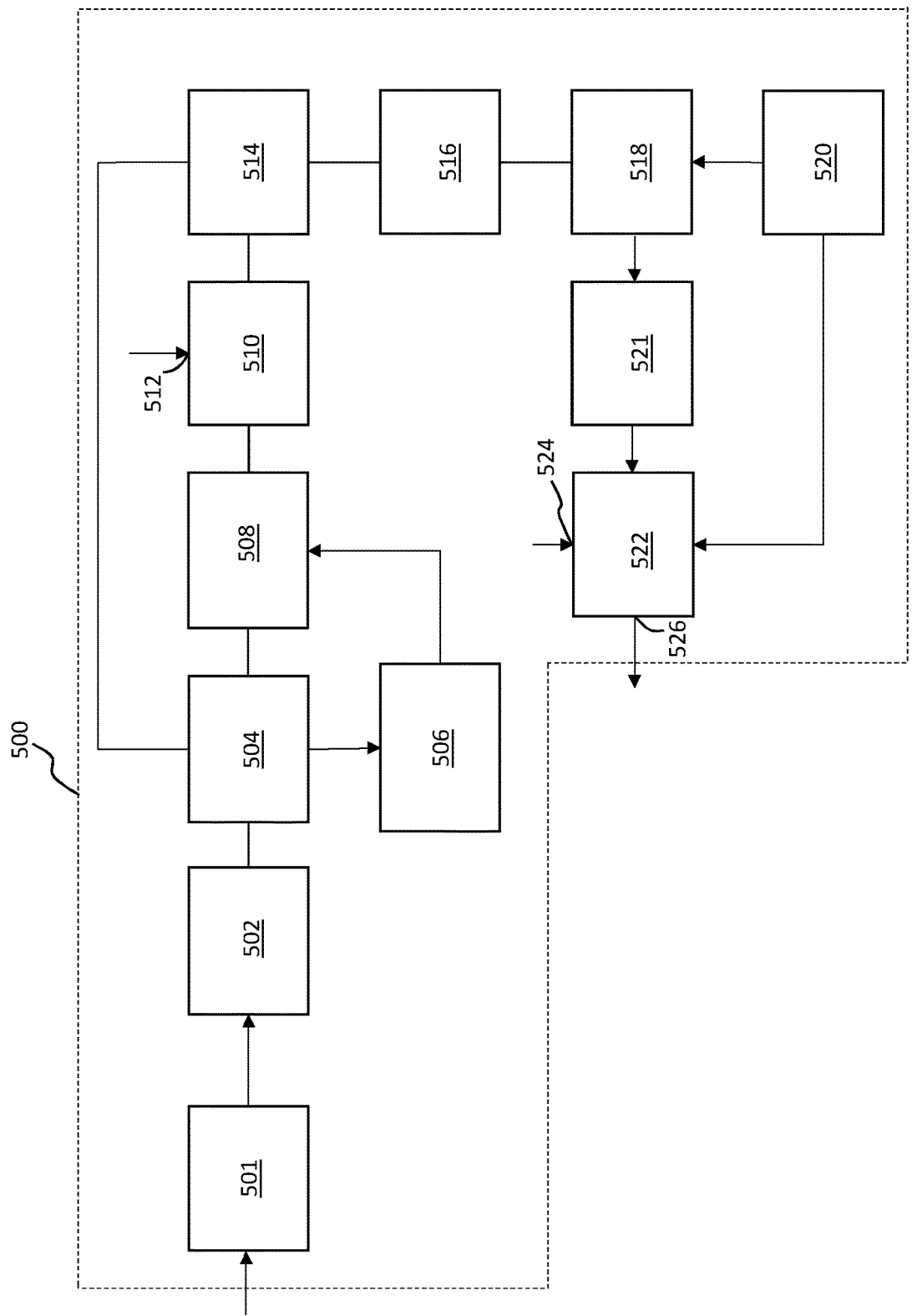
FIG. 5 is a schematic diagram of an alert verification processor supported by a processor of FIG. 4 and constituting an embodiment of the invention.

Turning to FIG. 5, in this example, the processing resource 402 supports an alert verification processor 500, the operation of which will be described in further detail later herein with reference to FIGS. 7 to 11. The processing resource 402 supports a frame extractor 501 capable of communicating with a cropping unit 502, the cropping unit 502 being capable of communicating with a frame difference calculator 504. The frame difference calculator 504 is capable of communicating with a frame statistics calculator 506 and a normalisation unit 508. The normalisation unit 508 is also capable of communicating with the frame statistics calculator 506 and a motion compensator 510, the motion compensator 510 having an input 512 for receiving speed data.

A frame summation unit 514 is capable of communicating with the motion compensator 510, the frame difference calculator 504 and a thresholding unit 516, the thresholding unit 516 also being capable of communicating with a frame cleaner 518. The frame cleaner 518 is capable of communicating with a cluster size calculator 521, the cluster size calculator 521 being capable of communicating with a decision unit 522 having an alert input 524 and a decision output 526. The alarm verification processor 500 also comprises a cluster estimator 520 capable of communicating with the frame cleaner 518 and the decision unit 522.

Figure 6:
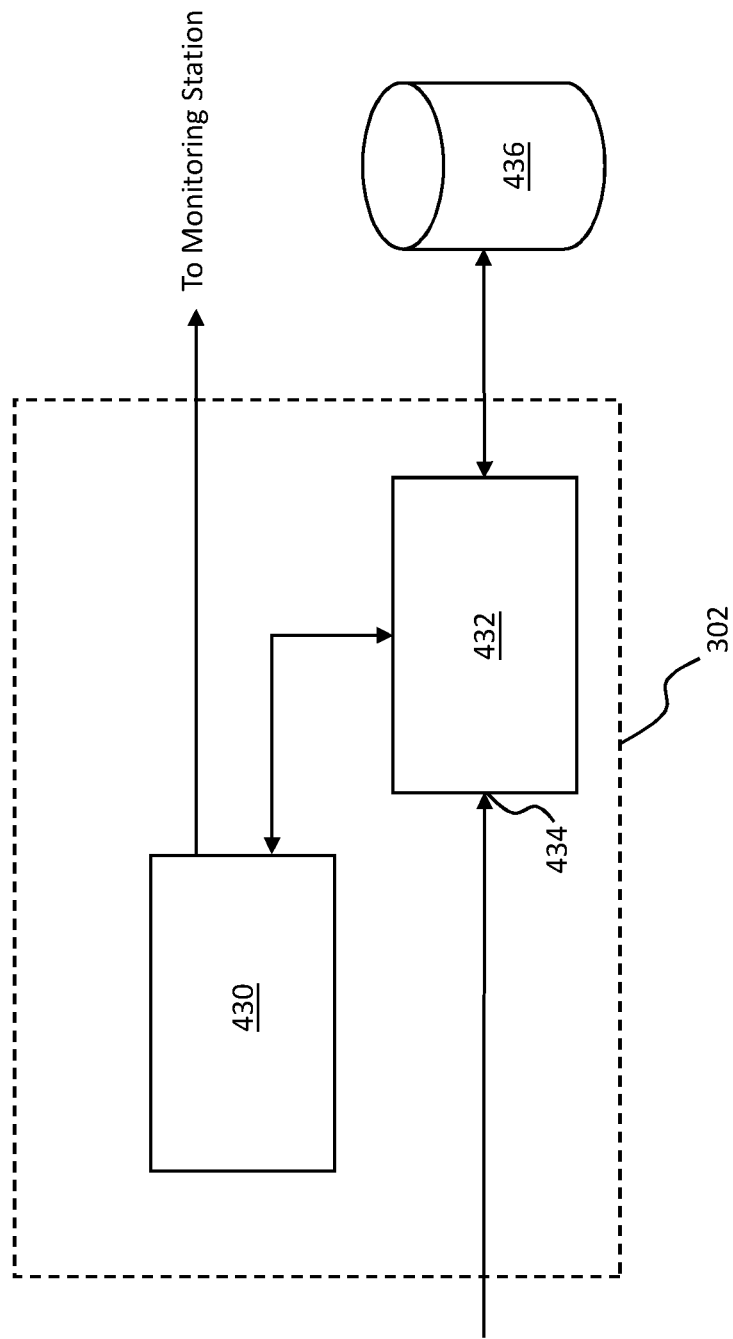
FIG. 6 is a schematic diagram of a part of an alarm processor supported by a processing resource of FIG. 3.

Referring to FIG. 6, the local processor 302 supports an alert processor that comprises, inter alia, an alert generation module 430 operably coupled to a video feed processing unit 432, the video feed processing unit 432 being operably coupled to a video input 434 and a circular video buffer 436. The video input 434 is operably coupled to the alert generation module 430. As some functionality of the alert processor supported by the local processor 302 is not directly relevant to an understanding of the embodiments set forth herein, only enough of the functionality provided by the local processor 302 is described herein for the sake of clarity and conciseness of description. However, further details of an example of functionality that can be provided by the alert processor is described in International patent publication no. WO 2013/021183, the contents of which are hereby incorporated by reference.

Figure 7:
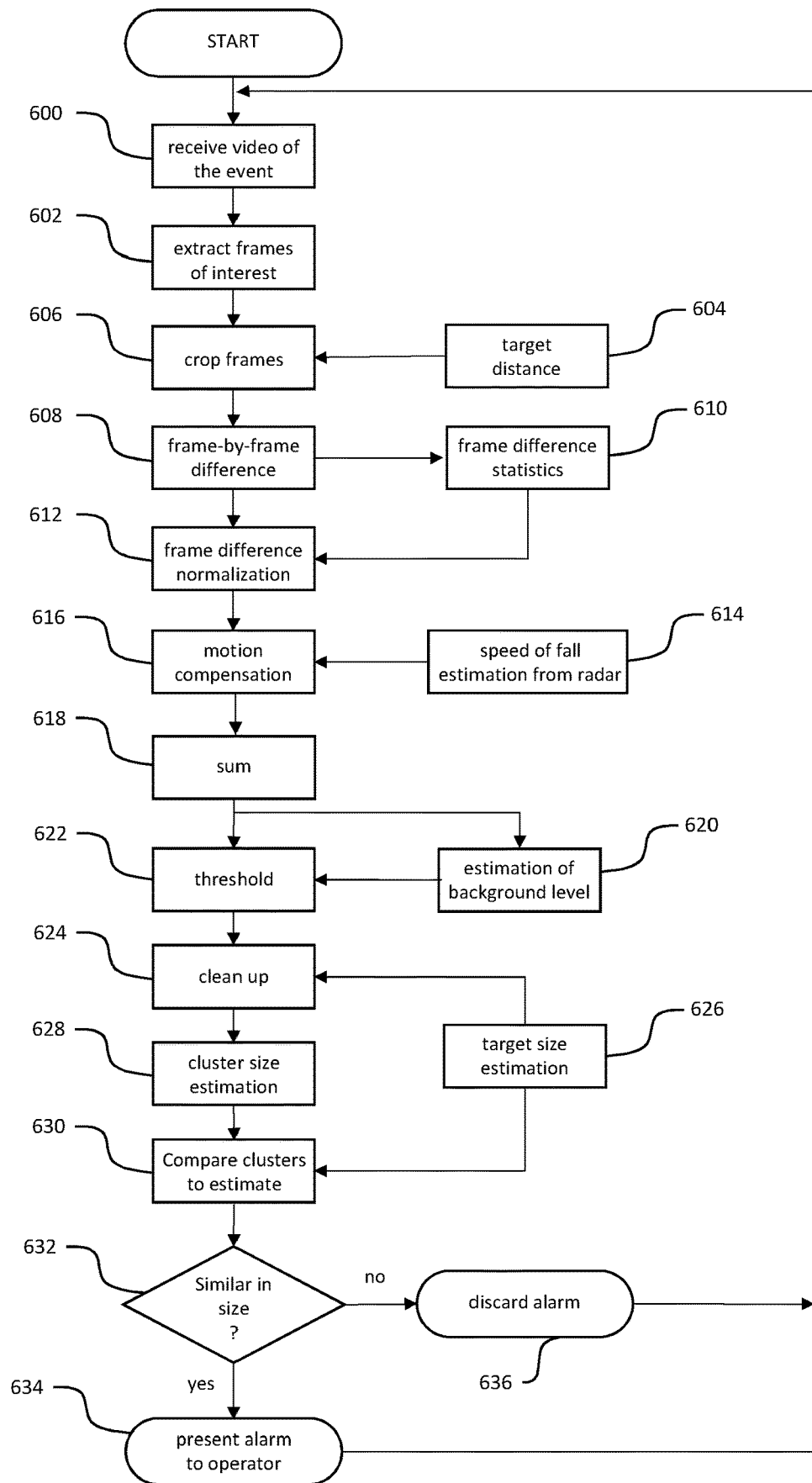
FIG. 7 is a flow diagram of a method of verifying a triggered alert constituting another embodiment of the invention.

Turning to FIG. 7, as described, for example in International patent publication no. WO 2013/021183, when a potential man overboard event occurs, the monitoring module 102 has to detect a falling body. The monitoring module 102 monitors a portion of a volume that needs to be monitored. When the body falls from the vessel 100, the body passes across at least part of the portion of the volume being monitored by the monitoring module 102. The first and second radar modules 304, 308 serve to monitor the at least part of the portion of the volume being monitored (hereinafter referred to as the "monitored volume portion") in order to detect passage of the body across the at least part of the monitored volume portion. However, the visual imaging resolution of the first and second radar modules 304, 308 is such that if the data generated by the first and second radar modules 304, 308 were to be visually displayed, a human operator would not be able to identify visually the nature of the body conclusively as human. Indeed, angular or spatial resolution limitations and detection clustering techniques employed by the first and second radar modules 304, 308 is such that the data acquired from the first and second radar, if displayed graphically, appear as so-called "points", "blobs" or "blips", typical of radar. Consequently, it is not possible to determine whether one or more reflections detected by a radar of the spatial resolution described herein, when presented, relate to a human body, a non-human object being dropped, or something else. Although, in this example, a pair of radar modules is employed, the skilled person should appreciate that the monitoring module 102 can comprise a greater or smaller number of radar modules.

The first and second radar modules 304, 308 generate (Step 600) radar data by scanning a volume, in this example, 15 times per second in order to detect fixed and moving objects with a location accuracy of a few centimetres. The radar data generated is communicated via the first and second CAN-to-USB interfaces 306, 310 to the local processor 302. The radar data is subjected to various processing operations, for example filtering, as required by any suitable processing methodology, such as described in International patent publication no. WO 2013/021183, in order to yield one or more radar tracks that are analysed and further processed so as to identify tracks likely to represent a falling body, i.e. objects moving at high speed from the top to the bottom of the vessel 100.

During receipt and processing of the radar-related data, the video feed processing unit 432 of the alert processor supported by the local processor 302 receives video data corresponding to video frames that have been captured by the camera 312 at the same time as the radar data was generated by the first and second radar modules 304, 308. The video data generated is processed and communicated to the local processing resource 302 by the video server unit 314. Upon receipt of the video data via the video input 434, the video feed processing unit 432 buffers the video data in the circular video buffer 436. The video data is buffered so as to maintain a record of video corresponding to elapse of a most recent predetermined period of time. In this respect, the predetermined period of time is a rolling time window and includes the time frame of the radar data being processed. Hence, the most recent n seconds of video is stored. Of course, if greater storage capacity is available all video from a journey can be stored for subsequent review. In an alternative embodiment, the video server unit 314 can manage the buffering of video data.

In the event that a potential man over board track is detected, the detection is communicated to the alert generation module 430. The alert generation module 430 then obtains the buffered video data relating to the time period that includes the time the potential man overboard event was detected from the video buffer 436 via the video feed processing unit 432. As mentioned above, this process of detection and obtaining the video data involves further processing steps, but in order to maintain conciseness of description such further details have been omitted as the skilled person would appreciate the additional processing required, for example as described in International patent publication no. WO 2013/021183.

Once obtained, the alert generation module 430 generates an alert message that includes the radar data and the video data including the period of time in which the potential man overboard event is detected to have occurred. If desired, the alert message can include time data, for example a timestamp, relating to the time the man overboard event was detected.

The alert message is then communicated to the monitoring station 200 using the wireless communications functionality of the data communications module 300 so that the alert message is communicated via the wireless communication network. Alternatively, if available, a wired communication network can be used for alert message transmission from the monitoring module 102 to the monitoring station 200.

At the monitoring station 200, and with reference to FIG. 7, the computing apparatus 400 supports the alert verification application mentioned above, the video data of the alert message received by the monitoring station 200 being extracted and provided to the frame extractor 500 (Step 600) and the receipt of the alert triggers the generation of an alert receipt signal that is applied at the alert input 524 of the decision unit 522.

From the frames of video data received, the frame extractor 500 extracts (Step 602) a number of sequential frames of relevance for the purpose of verifying the alert received by the monitoring station 200. In this regard, the frames of video data received can comprise video frames containing information immediately prior to (and so in a time window immediately preceding the triggering of the alert) and immediately following the video frame data corresponding to images of the falling body. In addition to extracting the number of frames of relevance, the frame extractor 500 also extracts, in this example, frames preceding the number of frames of relevance.

Once the relevant video data has been extracted, the extracted video frame data is communicated to the cropping unit 502 and the cropping unit 502 also accesses the radar data received with the alert message from the monitoring module 102 in order to use ranging track data to determine (Step 604) a target distance value corresponding to an average distance from the monitoring module 102 to the falling body in respect of the fall. The cropping unit 502 then crops (Step 606) the received frames of video in order to isolate the portion of each frame containing the falling body, hereinafter also referred to as the "target", i.e. the portion of each frame traversed by the target. In order to crop the frames of image data received, the cropping unit 502 requires additional information in the form of the position and field of view of the camera 312. Using this information and the target distance value, the cropping unit 502 calculates the portion of each video frame comprising the target and the frames of video data are longitudinally cropped accordingly in order to retain the portions calculated. In this respect, a maximum horizontal displacement of a trajectory of the target with respect to a boundary of a vertical structure being monitored, for example the vessel 100, is estimated as a function of a maximum measured horizontal speed, which is calculated from the radar data received, and a maximum fall height, which is assumed a priori. The maximum horizontal displacement is then converted from units of metres to image columns for the distance of the camera 312, the field of view of the camera 312, image resolution, and the orientation of the camera 312, which are known a priori at the time of installation for the monitoring system. The image columns corresponding to vertical strips of each frame beyond the portion of each frame containing the maximum horizontal displacement calculated are removed. Typically, such processing results in the first and last image columns of a given frame of image data being removed. In some embodiments, the cropping functionality can be augmented by removing portions of the frames of image data containing pixel that are not of interest, for example image data resulting from permanent or semi-permanent marks on the lens of the camera 312, or intentional but unwanted information superimposed on the frames of image data, such as timestamp information. The same cropping is also performed on the preceding frames extracted by the frame extractor 501.

The resulting sub-frames of image data constitute frames and frame zones of interest. The sub-frames are then communicated to the frame difference calculator 504, which then executes, in this example, the following frame difference processing (Step 608). In this respect, each sub-frame is subtracted from a succeeding sub-frame. For example, assuming there are N sub-frames of image data, a difference is calculated between: a second sub-frame and a first sub-frame, a third sub-frame and a second sub-frame . . . an $N^{th}$ sub-frame and an $(N-1)^{th}$ sub-frame. This process serves to remove parts of the sub-frames that correspond to stationary elements of the images, for example background elements, thereby highlighting portions of the sub-frames that correspond to movement. Likewise, a set of cropped preceding frames are communicated to the frame difference calculator 504 and undergo the same processing steps as the frames of interest to yield preceding difference frames, which are communicated to the frame summation unit 514 for application in a manner that will be described later herein.

Figure 8:
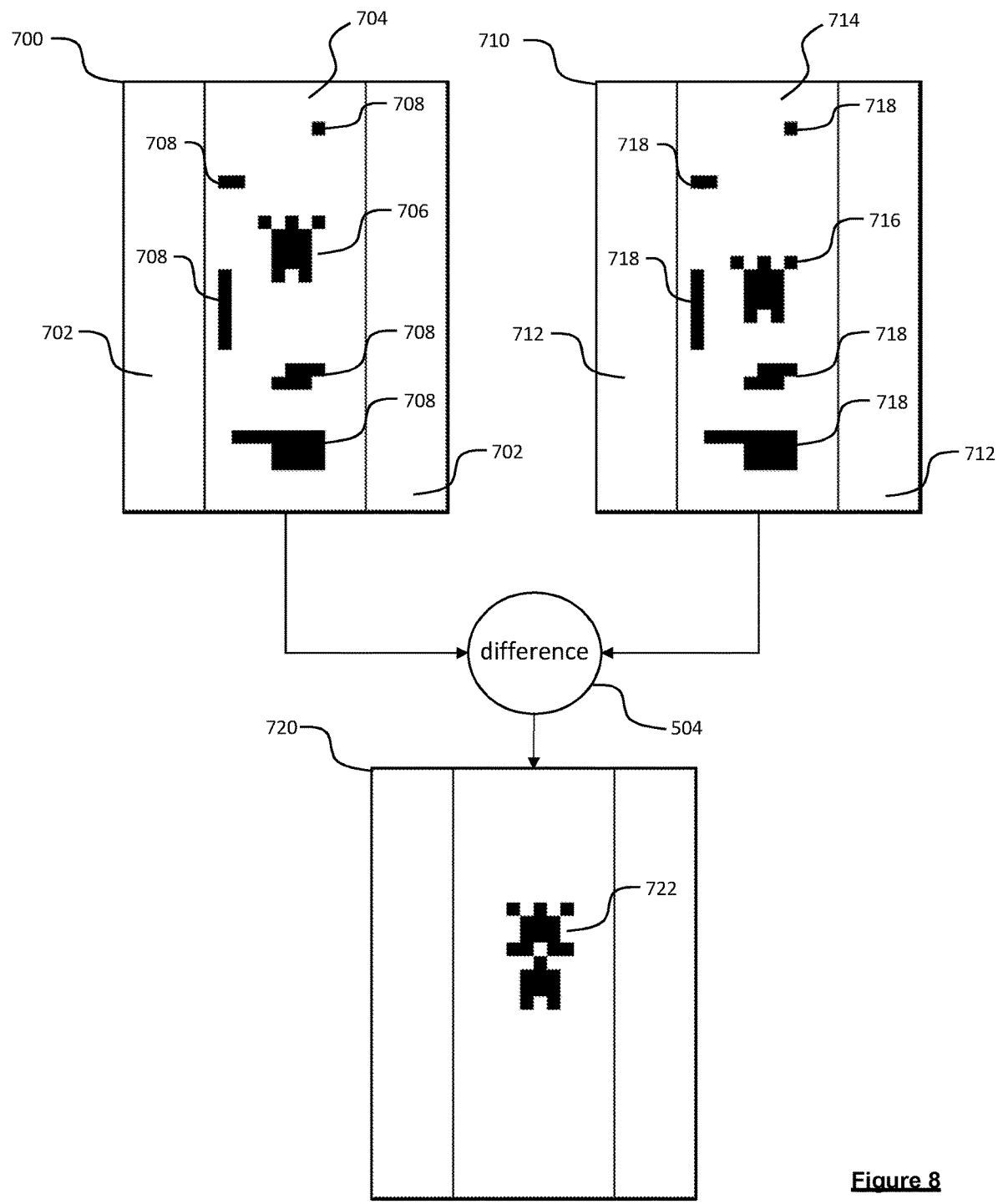
FIG. 8 is a schematic diagram of an image processing stage of FIG. 7, the image being inverted for ease of understanding.

Referring to FIG. 8, taking two consecutive frames of image data 700, 710, these are cropped (Step 606) as described above by removal of the first and last columns 702, 712 to leave the central portions 704, 714 of the frames 700, 710 for subsequent processing. Each of the two consecutive sub-frames 704, 714 therefore contain the target or falling body 706, 716, as well as background features 708, 718, which have a tendency to be substantially static over such a short period of time, namely the time between frames as dictated by the frame rate of the video data, for example between about $\frac{1}{5}^{th}$ of a second and about $\frac{1}{30}^{th}$ of a second. The frame difference calculator 504 subtracts (Step 608) the respective values of the pixels of the two sub-frames of image data 704, 714 to yield a difference frame 720 comprising only a cluster of pixels 722 surviving the difference computation and corresponding to the moving target. For each difference frame generated, the difference frame 720 is communicated to the frame statistics calculator 506, which performs statistical analysis (Step 610) on the pixel values of the difference frame 720, for example mean and standard deviation calculations. Once statistical analysis has been performed in respect of each of the difference frames to be calculated, the statistical values calculated are averaged, for example the means and standard deviations calculated are averaged, and the results of the averaging is communicated to the normalisation unit 508 by the frame statistics calculator 506, which also receives and buffers the difference frames generated by the frame difference calculator 504. The normalisation unit 508 then normalises (Step 612) each difference frame buffered, for example by subtraction of the mean value calculated from the intensity of each pixel respectively and applying the standard deviation value calculated as a threshold to each pixel respectively, whereby pixels having an intensity equal to or greater than the standard deviation calculated are retained and pixels having respective intensities below the standard deviation calculated are set to zero. The normalisation process can be tuned using an input parameter, which in this example is a weighting factor applied to weight the standard deviation calculated and applied to the pixels of each of the difference frames buffered.

The normalised difference frames are then communicated to the motion compensator 510. The processor 402 analyses the trajectory of the target from the received radar data in order to estimate an average speed of fall of the target in units of metres per second. The processor 402 then converts the average speed of fall from three-dimensional space to two-dimensional image space using the a priori knowledge of the position of the camera 312, the field of view of the camera 312, image resolution and the previously calculated distance between the camera 312 and the target. In this respect, the rate of descent is translated from three-dimensional space into a two-dimensional pixel domain of the normalised difference frames. The average speed of fall in units of image rows per frame is therefore calculated (Step 614) and communicated to the motion compensator 510 via the input 512.

Figure 9:
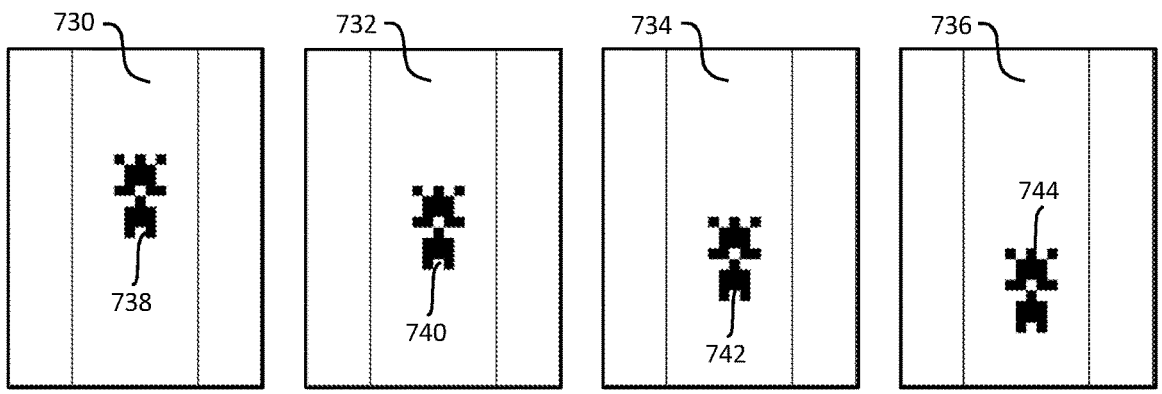
FIG. 9 is a schematic diagram of further image processing stages of FIG. 7, the image being inverted for ease of understanding.
Figure 9:
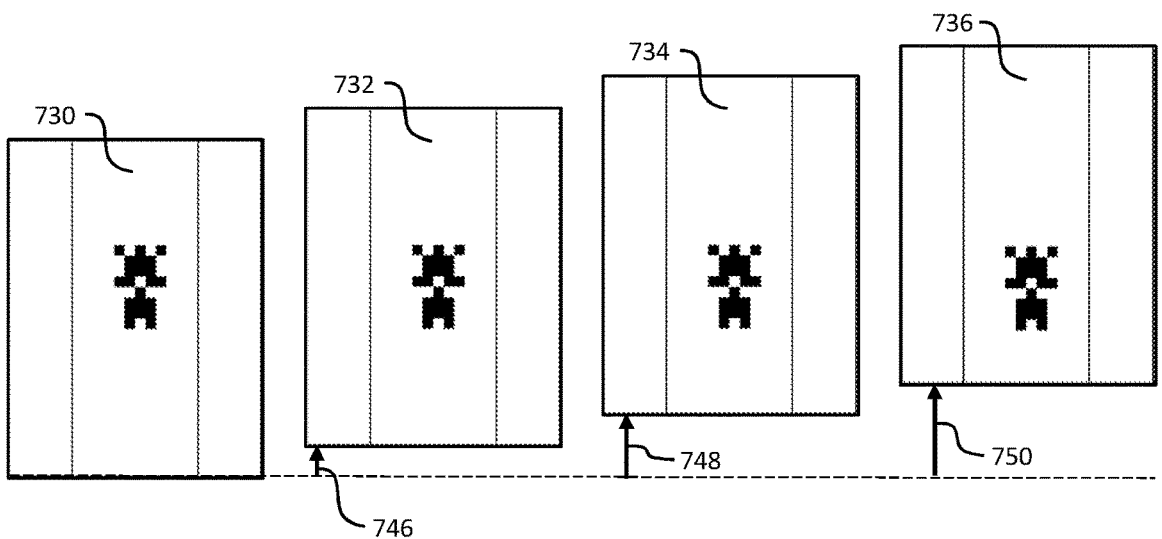
Figure 9:
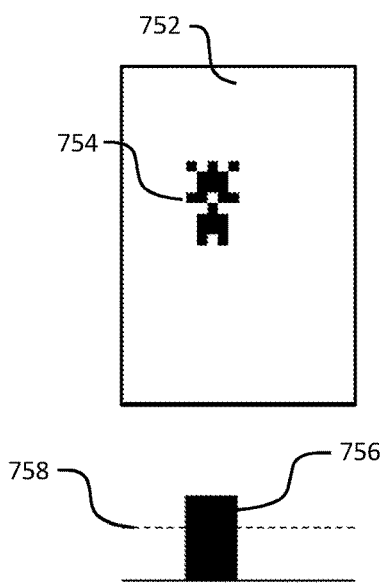
Figure 10:
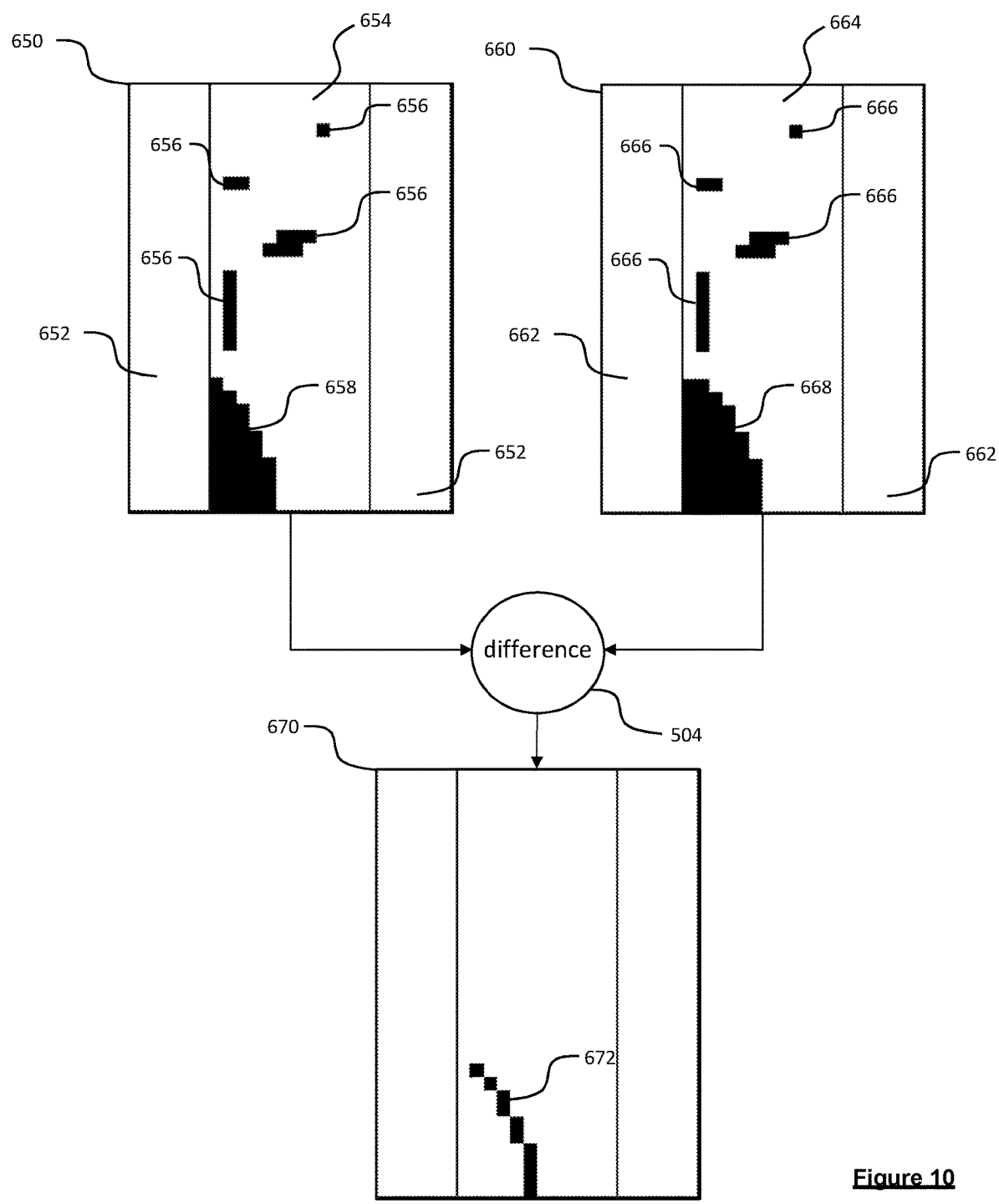
FIG. 10 is a schematic diagram of the image processing stage of FIG. 8 applied to different data, the image being inverted for ease of understanding.

Referring to FIG. 9, the motion compensator 510 then shifts (Step 616) each normalised difference frame up by a respective number of image rows corresponding to the respective distance displaced by the target at the average speed of fall in units of image rows per frame for time in respect of the normalised difference frame being shifted. In this respect, each frame is shifted up by a number of image rows corresponding to the product of the position in the sequence of normalised difference frames and the average speed of fall in units of rows per frame based upon a known frame rate, i.e. speed and time are used to determine distance in the units of the two dimensional image space. For example, a first normalised difference frame 730, a second normalised difference frame 732, a third normalised difference frame 734 and a fourth normalised difference frame 736 are sequential in nature and respectively contain clusters of pixels that relate to a moving target at different positions for different moments in time. As such, the first normalised difference frame 730 comprises a first cluster 738, the second normalised difference frame 732 comprises a second cluster 740, the third normalised difference frame 734 comprises a third cluster 742 and the fourth normalised difference frame 736 comprises a fourth cluster 744, each of the first, second, third, and fourth clusters 738, 740, 742, 744 being displaced with respect to each other and progression of time. The first normalised difference frame 730 corresponds to a first position, the second normalised difference frame 732 corresponds to a second position, the third normalised difference frame 734 corresponds to a third position and the fourth normalised difference frame 736 corresponds to a fourth position. In this example, the average speed of fall is calculated at 4 rows per frame. The normalised difference frames are numbered starting from zero. As such the first normalised difference frame 730 is translated by (0×4) 0 rows, the second normalised difference frame 732 is translated by (1×4) 4 rows 746, the third normalised difference frame 734 is translated by (2×4) 8 rows 748 and the fourth normalised difference frame 736 is translated by (3×4) 12 rows 750.

As translation upwardly takes place, the motion compensator 510 wraps upper rows of each normalised difference frame being processed to the bottom of each respective normalised difference frame. For example, if a normalised difference frame is shifted upwardly by four rows, the uppermost four rows assume the space vacated by the bottom four rows. This approach supports implementation convenience as well as avoids the introduction of artificial image data, for example black coloured rows, which can have an impact upon the results achieved.

After motion compensation by the motion compensator 510, the cluster 738, 740, 742, 744 appear to occupy approximately the same position in each motion compensated normalised difference frame. Subsequently, the motion compensated normalised difference frames are communicated to the frame summation unit 514 that sums (Step 618) the motion compensated normalised difference frames on a pixel-by-pixel basis to yield a composite frame 752 comprising image elements relating to the target falling at the average speed calculated.

In this respect, the intensity 756 of the pixels in the cluster 754 constituting the target in the composite frame 752 in the horizontal direction exceeds a predetermined intensity threshold 758.

As mentioned above, the frame summation unit 514 also receives the preceding difference frames from the frame difference calculator 504 for processing in a manner to be described later herein.

In contrast, image elements that do not relate to a falling body do not benefit from the additive effect described above and so the intensity of pixels relating to image elements that do not correspond to a falling body do not typically attain the predetermined intensity threshold. This will now be exemplified by reference to FIG. 10, which relates to video data including image data relating to waves and/or water spray. However, it should be appreciated that the use of the video analytics described herein is not confined to addressing the triggering of false alarms by image data relating to waves and/or water spray and the techniques can be applied to obviate or at least mitigate the effects of other causes of false alarms.

Taking a bow wave as an example, the first and second radar modules 304, 308 can generate a vertical track which, in reality, does not correspond to an actual falling body. In this respect, a bow wave comprises a very large number of water droplets, which are detected by the radar modules 304, 308. The radar modules 304, 308 then try to generate tracks by associating detections. Given the multitude of detections, the radar modules 304, 308 can generate tracks by connecting detections associated with separate water droplets, which are detected in the same area, at the same time. As such, the radar modules 304, 308 do not in practice track a single water droplet along its respective movement. Instead, the radar modules 304, 308 generate a track by connecting separate detections, which can be mistaken for a falling object. In relation to the video data, this includes image data corresponding to waves or comprises image data relating to water spray, but not image data relating to a falling body, and when an alert message is incorrectly generated, the image elements relating to the waves, or other events that do not correspond to a falling body, should not benefit from the additive effect described above. In this respect, the video data again comprises consecutive frames of image data, but on this occasion the frames show waves moving in a horizontal direction. The image frames are received, optionally reduced in number by selection, and then cropped (Steps 600 to 606) in order to yield sub-frames of image data constituting frames and frame zones of interest. The sub-frames are then communicated to the frame difference calculator 504, which then executes, in this example, the frame difference processing (Step 608). In this respect, each sub-frame is as above subtracted from a succeeding sub-frame. As mentioned above, this process serves to remove parts of the sub-frames that correspond to stationary elements of the images, for example background elements, thereby highlighting portions of the sub-frames that correspond to movement.

Taking, for example, two consecutive frames of image data 650, 660 that have been cropped (Step 606) as described above by removal of the first and last columns 652, 662 to leave the central portions 654, 664 of the frames 650, 660 for subsequent processing. Each of the two consecutive sub-frames 654, 664 therefore contain, in this example, extraneous image elements 656, 666, 658, 668 relating to, for example waves 658, 668, as well as other background features 656, 666, the latter having a tendency to be substantially static over such a short period of time, namely the time between frames as dictated by the frame rate of the video data. The frame difference calculator 504 subtracts (Step 608) the respective values of the pixels of the two sub-frames of image data 654, 664 to yield a difference frame 670 comprising only a plurality of pixels 672 surviving the difference computation and corresponding to the horizontally moving wave 658, 668. Image elements that are substantially static between sub-frames cancel each other out during the difference calculation. For each difference frame generated, the difference frame 670 is communicated to the frame statistics calculator 506, which performs statistical analysis (Step 610) on the pixel values of the difference frame 670, for example mean and standard deviation calculations. Once statistical analysis has been performed in respect of each of the difference frames to be calculated, the statistical values calculated are averaged, for example the means and standard deviations calculated are averaged, and the results of the averaging are communicated to the normalisation unit 508 by the frame statistics calculator 506, which also receives and buffers the difference frames generated by the frame difference calculator 504. The normalisation unit 508 then normalises (Step 612) each difference frame buffered, for example by subtraction of the mean value calculated from the intensity of each pixel respectively and applying as mentioned above the standard deviation value calculated as a threshold to each pixel respectively, whereby pixels having an intensity equal to or greater than the standard deviation value calculated are retained and pixels having respective intensities below the standard deviation calculated are set to zero. The normalisation process can be tuned using an input parameter, which in this example is the weighting factor mentioned above applied to weight the standard deviation calculated and applied to the pixels of each of the difference frames buffered.

The normalised difference frames are then communicated to the motion compensator 510. The processor 402 analyses the trajectory of a target responsible for the generation of the alert message from the received radar data in order to estimate an average speed of fall of the target in units of metres per second. The processor 402 then converts the average speed of fall from three-dimensional space to two-dimensional image space using the a priori knowledge of the position of the camera 312, image resolution, the field of view of the camera 312 and the previously calculated distance between the camera 312 and the target. The average speed of fall in units of image rows per frame is therefore calculated (Step 614) and communicated to the motion compensator 510 via the input 512.

Figure 11:
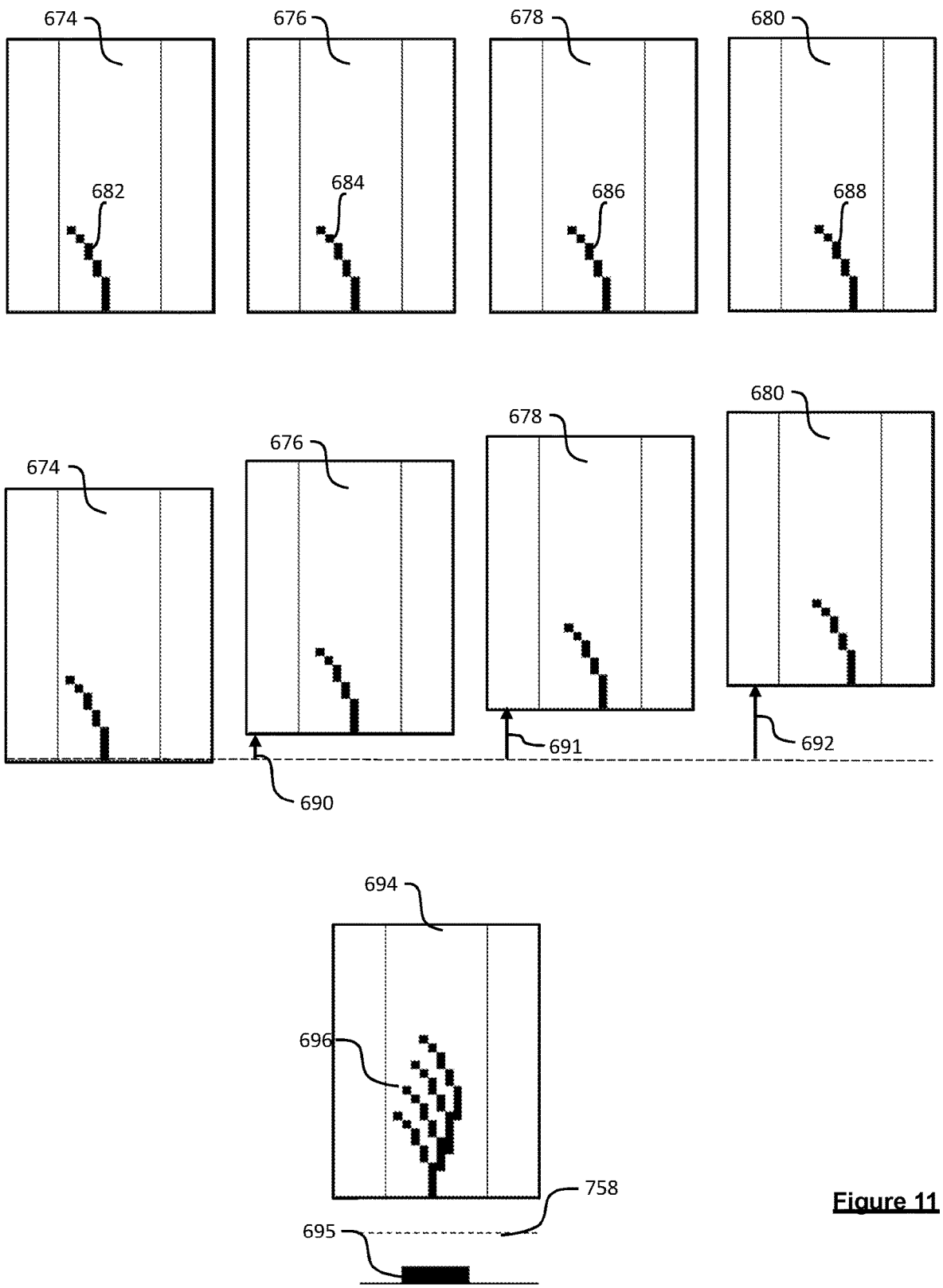
FIG. 11 is a schematic diagram of the further image processing stages of FIG. 9 applied to different data, the image being inverted for ease of understanding.

Referring to FIG. 11, and as mentioned above in relation to FIG. 9, the motion compensator 510 then shifts (Step 616) each normalised difference frame up by a respective number of image rows corresponding to the respective distance displaced by the target at the average speed of fall in units of image rows per frame. In this respect, each frame is shifted up by a number of image rows corresponding to the product of the position in the sequence of the normalised difference frames and the average speed of fall in units of rows per frame, i.e. speed and time are used to determine distance in the units of the two dimensional image space. For example, a first normalised difference frame 674, a second normalised difference frame 676, a third normalised difference frame 678 and a fourth normalised difference frame 680 are sequential in nature and respectively contain the plurality of pixels that relate to the horizontally moving wave at different positions for different moments in time. As such, the first normalised difference frame 674 comprises a first plurality of pixels 682, the second normalised difference frame 676 comprises a second plurality of pixels 684, the third normalised difference frame 678 comprises a third plurality of pixels 686 and the fourth normalised difference frame 680 comprises a fourth plurality of pixels 688, each of the first, second, third, and fourth plurality of pixels 682, 684, 686, 688 being displaced with respect to each other horizontally with progression of time. The first normalised difference frame 674 corresponds to a first position, the second normalised difference frame 676 corresponds to a second position, the third normalised difference frame 678 corresponds to a third position and the fourth normalised difference frame 680 corresponds to a fourth position. In this example, the average speed of fall in a radar track responsible for generation of the alert message is also calculated at 4 rows per frame. The normalised difference frames are numbered starting from zero. As such, the first normalised difference frame 674 is translated by (0×4) 0 rows, the second normalised difference frame 676 is translated by (1×4) 4 rows 690, the third normalised difference frame 678 is translated by (2×4) 8 rows 691 and the fourth normalised difference frame 680 is translated by (3×4) 12 rows 692.

As translation upwardly takes place, the motion compensator 510 wraps upper rows of each normalised difference frame being processed to the bottom of each respective normalised difference frame. For example, if a normalised difference frame is shifted upwardly by four rows, the uppermost four rows assume the space vacated by the bottom four rows.

After motion compensation by the motion compensator 510, the plurality of pixels 682, 684, 686, 688 do not appear to occupy approximately the same position in each motion compensated normalised difference frame. Instead, the plurality of pixels 682, 684, 686, 688 appear as respective groups of pixels moving horizontally and vertically.

As previously described above, the motion compensated normalised difference frames are communicated to the frame summation unit 514 that sums (Step 618) the motion compensated normalised difference frames on a pixel-by-pixel basis to yield a composite frame 694 comprising image elements relating to the wave appearing as a splaying or spreading of the plurality of pixels across the composite frame 694 in both horizontal and vertical directions.

In this respect, in the horizontal direction, the respective intensities 695 of the pixels in the splayed plurality of pixels 696 of the composite frame 694 do not exceed the predetermined intensity threshold 758. As mentioned above, the frame summation unit 514 also receives the preceding difference frames mentioned above from the frame difference calculator 504 for processing in the following manner.

In both scenarios, i.e. the correct detection of a falling body and the false detection of a falling body, the predetermined intensity threshold 758 needs to be calculated and in this regard, the thresholding unit 516 determines (Step 620) a pixel intensity level of the background image elements, i.e. the image elements that are not depicting the falling body. To achieve this, the frame summation unit 514 sums the preceding difference frames, which do not contain the falling body, thereby providing a true representation of background image elements free of the falling body. The thresholding unit 516 receives the summation of the preceding difference frames and calculates therefrom statistics constituting background noise statistics, for example a mean and a standard deviation of the summed difference frames. The thresholding unit 516 then reduces the pixel intensity of the pixels of the composite frames 754, 696 by the mean pixel intensity calculated and the standard deviation calculated is then used to as the predetermined intensity threshold 758. The predetermined intensity threshold 758 is applied by setting (Step 622) to zero all pixels of the composite frames 754, 696 having respective intensities below the predetermined intensity threshold 758. In this respect, the thresholding unit 516 can set the colour of the pixels to be zeroed to a predetermined contrasting colour. In the context of the Red, Green, Blue (RGB) colour representation scheme, the pixels can be set to 0,0,0, for example black.

Despite the application of the predetermined intensity threshold 758, the thresholded composite frames 754, 696 can nevertheless comprise image elements that do not relate to the falling body. Consequently, the thresholded composite frame is communicated to the frame cleaner 518, which serves to remove (Step 624) spurious pixels from the thresholded composite frame. In this respect, the removal of the spurious pixels can be achieved by application of, for example, one or more morphological filters and/or two-dimensional median filters, thereby removing from the summation or composite image any clusters of pixels that are sized less than a size of cluster, the calculation of which will be described below in respect of tuning the filter(s).

In order to tune the filter(s), the characteristics of the filters are configured to match approximately an expected range of sizes of the object or body that should survive filtering. The degree of approximation depends upon the degree of selectivity required of the filter(s). The configuration of the filters concerns, for example, determining the size of a cluster of pixels that correspond to the target of interest. In this respect, the cluster estimator 520 calculates (Step 626) an expected target pixel cluster size, if present in the composite images 752, 694, using a priori information, for example camera geometry, such as a known location of the camera 312 relative to the target, optical characteristics of the camera 312, such as image resolution, and field of view of the camera 312, and distance of the camera from the target as determined from the radar ranging track data received. Furthermore, the cluster estimator 520 accesses predetermined target of interest size data. In this example, the predetermined target of interest is assumed to be approximately between about 1.5 m and about 2 m, which corresponds to a typical range of human heights. Using this information, the cluster estimator 520 calculates a cluster size in units of pixels in respect of the thresholded composite frame that corresponds to the target of interest in respect of the distance of the camera 312 from the target of interest. For example, the cluster estimator 520 can calculate a cluster size of 20×20 pixels. The calculated cluster size limits are communicated by the cluster estimator 520 to the frame cleaner 518 for application of the filtering functionality described above.

The calculated cluster size is also provided to the decision unit 524, which receives the thresholded and filtered composite frame. The thresholded and filtered composite frame is communicated by the frame cleaner 518 to the cluster size calculator 521, which calculates (Step 628) the actual size or sizes of any clusters of pixels that survived the thresholding and filtering and are still present in the thresholded and filtered composite frame. Thereafter, the size of the cluster or the sizes of the clusters remaining are communicated to the decision unit 524, which uses the calculated cluster size received from the cluster estimator 520 in order to determine (Step 630) whether the size of one or more of the clusters still present in the thresholded and filtered composite frame are similar in size to a cluster expected to correspond to the target of interest, for example a human body, for example within a predetermined size tolerance of the previously calculated cluster size. Taking 2 m as an example of a typical height selected by the cluster estimator 520 and communicated to the decision unit 524, the cluster value can be multiplied by predetermined tolerances, for example a lower limit tolerance and an upper limit tolerance, respectively, in order to obtain a range of values, depending upon the degree of selectivity required of the decision unit 524. For example, the lower limit tolerance can be 0.2 and the upper limit tolerance can be 3, resulting in a range of 0.4 m (2 m×0.2) and 6 m (2 m×3). Using this information, the decision unit 524 calculates cluster size limits in units of pixels in respect of the thresholded composite frame that corresponds to the target of interest in respect of the distance of the camera 312 from the target of interest. For example, using the above tolerances, the decision unit 524 can calculate cluster size limits of between 4×4 pixels and 60×60 pixels.

In the event that the decision unit 524 determines (Step 632) that one of the clusters in the thresholded and filtered composite frame falls within a range of sizes delimited by the calculated cluster size limits, then the alert message received at the alert input 524 of the decision unit 522 is classified as relating to a man overboard event and the alert message is processed further (Step 634) by an alert monitoring application in accordance with the processing methodology with which the above method and apparatus has been integrated, for example the processing as described in International patent publication no. WO 2013/021183. The alert message is then used to provide pertinent information to a human operator to visually confirm that an MOB event has occurred. For example, the provisional detection of the MOB event results in the human operator being presented with the video data of the alert message in order to enable the human operator to identify readily the nature of the body detected and thereby provide visual confirmation of the MOB event by the human operator.

Otherwise, in the event that the decision unit 524 determines (Step 632) that one of the clusters in the thresholded and filtered composite frame falls outside of the range of sizes delimited by the calculated cluster size limits, the alert message is discarded (Step 636) and not processed further on account of the alert being determined to be a false alarm.

Figure 12:
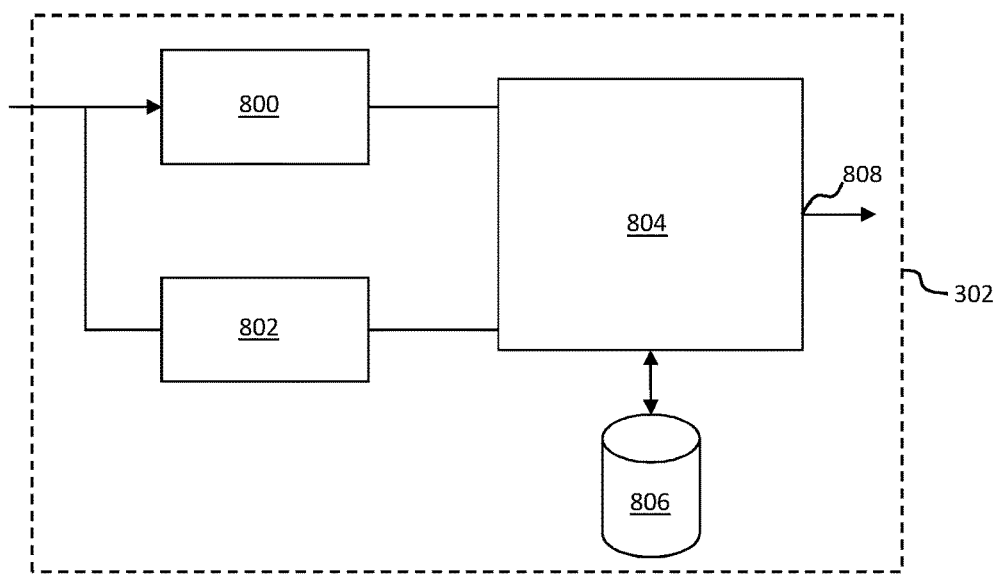
FIG. 12 is a schematic diagram of another alert verification processor constituting a further embodiment of the invention.

In another embodiment of the invention, an additional or alternative verification apparatus and method can be employed. Referring to FIG. 12, the processing unit 302 supports an angle calculator 800 and a height calculator 802, both of which have respective inputs operably coupled to the first and second sensor modules 304, 308 via the first and second interfaces 306, 310 in order to receive radar track data. Respective outputs of the angle calculator 800 and the height calculator 802 are operably coupled to a comparator 804 supported by the processing unit 302. The comparator 804 has access to a data store 806 that, in this example, includes a boundary line or calculated chord threshold as well as height and angle data for future analysis or adaptive calculation of the chord threshold. The comparator 804 has an output 808 to indicate whether or not a radar track in the radar data is considered to relate to one or more waves. The output 808 of the comparator 804 can be used independently or by the decision unit 522 described above. In this example, as will be described later herein, the comparator 804 cooperates with the data store 806 to serve as a radar track analyser.

Figure 13:
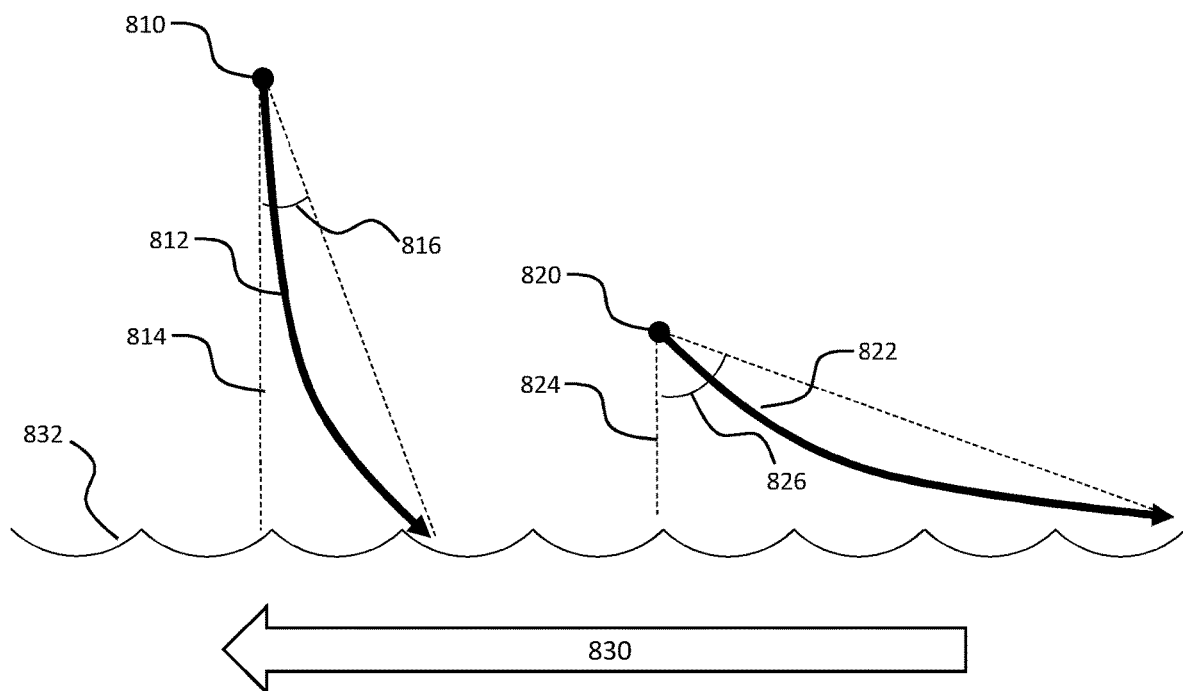
FIG. 13 is a schematic diagram of segments derived from radar tracks.

Turning to FIG. 13, a first target 810 constituting a genuine falling body, and therefore a high probability of an MOB event, follows a first path 812 that is different to a second path 822 followed by a second target 820 constituting a wave and therefore a low probability of an MOB event. A first geometric "chord" notionally extends between the start and end points of the first path 812, and a second geometric chord notionally extends between the start and end points of the second path 822. Taking into account direction of movement 830 of the vessel 100, the first path 812 starts at a first height 814 and extends to sea level 832, where the first path 812 is considered to terminate. Similarly, the second path 822 starts at a second height 824 and extends to sea level 832, where the second path 822 is considered to terminate. A first angle 816 is also defined by a convergence of the first chord and a vertical. A second angle 826 is defined by a convergence of the second chord and the vertical.

Figure 14:
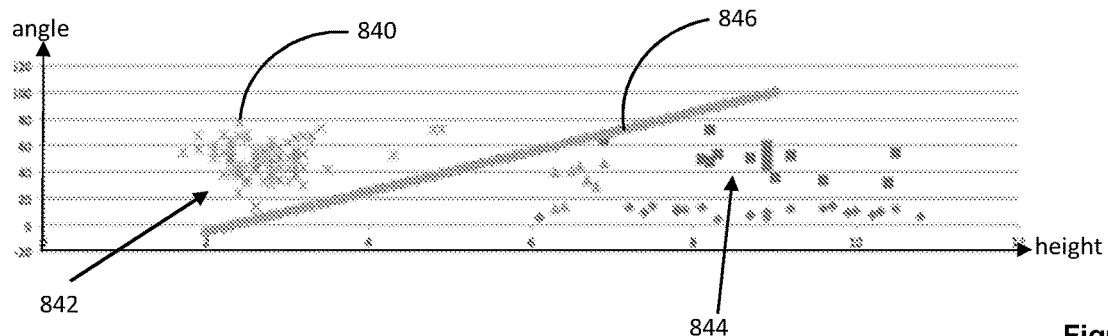
FIG. 14 is a graph of height vs. angle of chords and constituting a cluster classification diagram.

It has been recognised that the height and angle parameters of a radar track associated with a falling body are different to the height and angle parameters of a radar track associated with a wave. In this respect, waves are characterised by lower starting heights and greater angles, whereas falling bodies are characterised by higher starting heights and smaller angles. By accumulation of historical height and angle data associated with radar tracks, respective clusters of pairs of heights and angles can be manually classified and thus further pairs of heights and angles can be classified automatically based upon proximity of a given height/angle pair to clusters formed by the historical data. In this respect, and referring to FIG. 14, it has been found from empirical data that historical pairs of heights and angles 840 congregate as one of a first cluster 842 or a second cluster 844, depending upon whether the height/angle pair relates to a falling body or a wave. In the present example, the first cluster 842 relates to radar tracks of waves and the second cluster 844 relates to radar tracks of falling bodies. As such, it is possible to determine a boundary 846 between the first and second clusters 842, 844 relative to which a height/angle pair associated with a received radar track can be classified, thereby configuring the radar track analyser. In this respect, the boundary line extends through a height-angle plane, which is by its nature two-dimensional.

Figure 15:
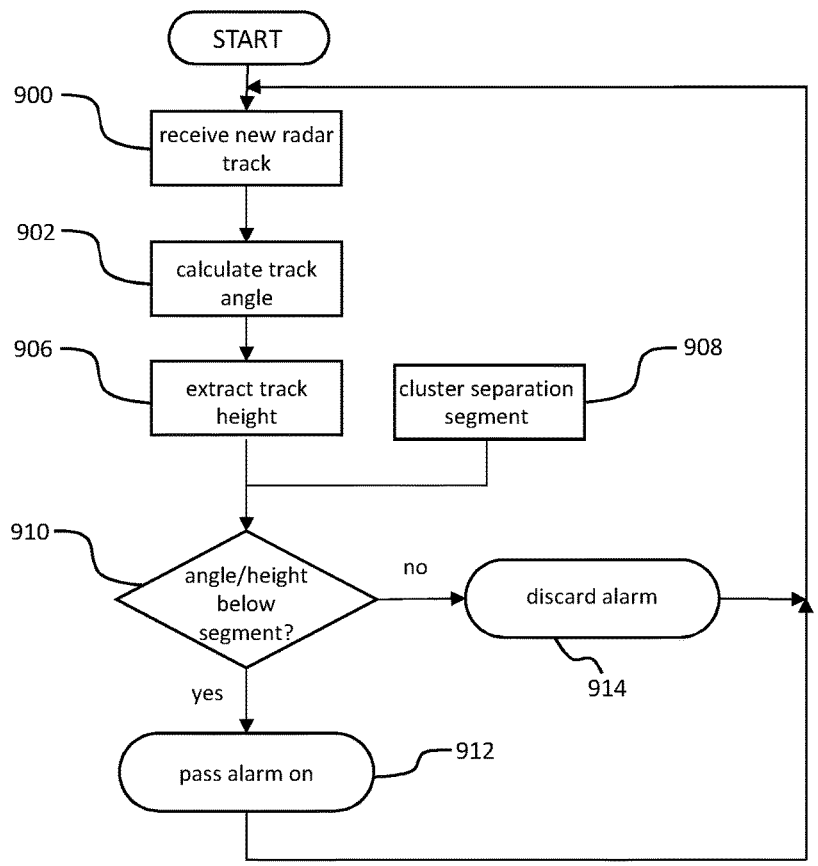
FIG. 15 is a flow diagram of a method of verifying a triggered alert and constituting yet another embodiment of the invention.

Consequently, in operation (FIG. 15), the angle calculator 800 and the height calculator 802 both receive (Step 900) a ranging or radar track generated, for example, in the processing unit 302 using outputs from the first and second interfaces. Using the ranging or radar track, the angle calculator 800 calculates (Step 902) a parameter, namely an angle (of the convergence of the chord with the vertical), and the height calculator 802 calculates (Step 904) another parameter, namely a height, from the radar track data received. The angle and height calculated are communicated to the comparator 804, which optionally stores the angle and height calculated. The radar track relates to a potential man overboard event in respect of a duration of a time window. Additionally, or alternatively, the comparator 804 accesses the data store 806 in order to obtain (Step 908) the classification boundary. Using the classification boundary, the comparator 804 analyses the height and angle data received relative to the classification boundary in order to determine (Step 910) whether the height and angle data received is determined to be closer to the first cluster 842, which is indicative of the received radar track relating to a wave, or closer to the second cluster 844, which is indicative of the received radar track relating to an MOB event. In the event that the received height and angle data is determined to correspond to an MOB event, the alert message generated by the alert generation module 430 is communicated (Step 912) by the decision unit 522 (if employed) to the monitoring station 200. Alternatively, in the event that the received height and angle data is determined to correspond to a wave, the alert message generated by the alert generation module 430 is discarded (Step 914) and so not communicated to the monitoring station 200. Hence, alerts caused by wave motion can be filtered from alerts caused by MOB events using the above technique.

As will be appreciated by the skilled person, the examples described herein relate to the detection of the man overboard event. Such alertable events relate to the detection of a falling body. However, the skilled person should appreciate that the system, apparatus and method described herein can be applied to converse directions of movement in order to detect a body climbing the hull of the vessel, for example in cases of piracy and/or hijacking.

In the examples described herein, the monitoring modules at least serve to collect data from the monitoring sensors. The data needs to be processed in order to detect a falling body. In this example, some data processing is also carried out by the monitoring module 102. However, data processing can be either centralised, or distributed, or a hybrid processing implementation, which is a combination of the centralised and distributed techniques (for example, radar data can be processed in the sensor modules 304, 308 and video buffering can be performed monitoring station 200, or vice versa). In the embodiments herein, collected data is processed directly by the monitoring module 102 and only alarm messages are transmitted to the monitoring station 200 for visualisation and raising an alarm. In a centralised approach, raw data is communicated to the monitoring station 200 for processing in order to detect a falling body as well as visualisation and raising an alarm.

Consequently, the skilled person should appreciate that some of or all the functions described herein could be performed in the processing unit 302 of the monitoring module 102. Similarly, some of the functions described herein can be performed in the monitoring station 200 rather than in the monitoring modules 102, depending on the processing architecture (distributed, hybrid, centralised). As such, references herein to a processing resource or processors are intended to embrace the provision one or more processing entities that need not necessarily be collocated and description of a processing resource processing different tasks need not require the same processing entity to perform the different tasks.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. A method of verifying a potential detection of a man overboard event recorded as a moving object in a plurality of sequential frames of image data in respect of a duration of a time window, the method comprising:
    receiving ranging track data in respect of the time window;
    identifying a geometric chord intersecting a start point and an end point of a path described by a ranging track of the ranging track data;
    determining a height of the start point;
    determining an angle defined by a convergence of the chord and a vertical;
    comparing the height and the angle relative to a boundary line in order to classify the path described by the ranging track in relation to a man overboard event; and
    verifying the potential detection of the man overboard event in response to the classification of the path described by the ranging track.

2. The method according to claim 1, wherein the boundary line is defined by a first parameter and a second parameter.

3. The method according to claim 2, wherein the first parameter is height and the second parameter is angle.

4. The method according to claim 1, wherein the boundary line is based upon empirical data.

5. The method according to claim 4, wherein the empirical data comprises clusters of pairs of height and angle data.

6. The method according to claim 1, further comprising:
    receiving an alert indicative of the potential detection of the man overboard event; and
    disregarding the alert when evaluation of the ranging track data by the comparison of the height and the angle relative to the boundary line results in a determination that the ranging track data does not relate to the man overboard event.

7. The method according to claim 1, wherein classification of the path described by the ranging track data as corresponding to the man overboard event comprises evaluation of the height and the angle relative to a predetermined boundary line extending in a height-angle plane.

8. The method of filtering alerts caused by wave motion from alerts caused by a man overboard event comprising the method of verifying a detection of a potential man overboard event according to claim 1.

9. A method of configuring a radar track analyser for verification of a man overboard event, the method comprising:

receiving a plurality of ranging track data sets;
for each of the plurality of ranging track data sets:
identifying a respective geometric chord intersecting a respective start point and a respective end point of a path described by a ranging track of the ranging track data;
determining a respective height of the respective start point;
determining a respective angle defined by a respective convergence of the respective chord and a vertical;
recording the respective height, the respective angle and a respective verified man overboard event status corresponding to the respective height and respective angle; and
identifying a first cluster of height and angle pairs and a second cluster of height and angle pairs; and
determining a boundary between the first and second clusters of height and angle pairs.

10. The method according to claim 9, wherein the boundary corresponds to a two-dimensional threshold.

11. An alert verification processing apparatus for verifying a potential detection of a man overboard event recorded as a moving object in a plurality of sequential frames of image data in respect of a duration of a time window, the apparatus comprising:
a processing resource arranged to receive ranging track data in respect of the time window; wherein
the processing resource is arranged to identify a geometric chord intersecting a start point and an end point of a path described by a ranging track of the ranging track data;
the processing resource is arranged to support a comparator, an angle calculator and a height calculator;
the height calculator is arranged to determine a height of the start point;
the angle calculator is arranged to determine an angle defined by a convergence of the chord and a vertical; and
a comparator is arranged to compare the height and the angle relative to a boundary line in order to classify the path described by the ranging track in relation to a man overboard event; and
the comparator is arranged to verify the potential detection of the man overboard event in response to the classification of the path described by the ranging track.

12. The apparatus according to claim 11, wherein the boundary line is defined by a first parameter and a second parameter.

13. The apparatus according to claim 12, wherein the first parameter is height and the second parameter is angle.

14. The apparatus according to claim 11, wherein the boundary line is based upon empirical data.

15. The apparatus according to claim 14, wherein the empirical data comprises clusters of pairs of height and angle data.

16. The apparatus according to claim 11, wherein
the processing resource is arranged to receive an alert indicative of the potential detection of the man overboard event; and
the processing resource is arranged also to disregard the alert when evaluation of the ranging track data by the comparison of the height and the angle relative to the boundary line results in a determination that the ranging track data does not relate to the man overboard event.

17. The apparatus according to claim 11, wherein classification of the path described by the ranging track data as corresponding to the man overboard event comprises the comparator evaluating the height and the angle relative to the boundary line extending in a height-angle plane.

18. An alert filtering apparatus for filtering alerts caused by wave motion from alerts caused by a man overboard event, the apparatus comprising the alert verification processing apparatus according to claim 11.

19. A configuration apparatus for a radar track analyser for verification of a man overboard event, the apparatus comprising:
a processing resource arranged to receive a plurality of ranging track data sets; wherein
for each of the plurality of ranging track data sets, the processing resource is arranged to:
identify a respective geometric chord intersecting a respective start point and a respective end point of a path described by a ranging track of the ranging track data;
determine a respective height of the respective start point;
determine a respective angle defined by a respective convergence of the respective chord and a vertical;
record the respective height, the respective angle and a respective verified man overboard event status corresponding to the respective height and respective angle; and
the processing resource is further arranged to identify a first cluster of height and angle pairs and a second cluster of height and angle pairs; and
the processing resource is arranged to determine a boundary between the first and second clusters of height and angle pairs.

20. The apparatus according to claim 19, wherein the boundary corresponds to a two-dimensional threshold.

* * * * *